US011843315B2

(12) United States Patent
Uchida

(10) Patent No.: US 11,843,315 B2
(45) Date of Patent: Dec. 12, 2023

(54) IN-VEHICLE BACKUP POWER SUPPLY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Koki Uchida, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 208 days.

(21) Appl. No.: 17/612,615

(22) PCT Filed: May 11, 2020

(86) PCT No.: PCT/JP2020/018760
§ 371 (c)(1),
(2) Date: Nov. 19, 2021

(87) PCT Pub. No.: WO2020/241214
PCT Pub. Date: Dec. 3, 2020

(65) Prior Publication Data
US 2022/0224147 A1 Jul. 14, 2022

(30) Foreign Application Priority Data
May 27, 2019 (JP) .................................. 2019-098237

(51) Int. Cl.
B60R 16/033 (2006.01)
H02M 3/00 (2006.01)
(Continued)

(52) U.S. Cl.
CPC ............. H02M 3/00 (2013.01); B60R 16/033 (2013.01); H02J 7/0016 (2013.01);
(Continued)

(58) Field of Classification Search
CPC ........ H02J 7/0016; H02J 7/0063; H02J 9/061; H02J 2207/20
See application file for complete search history.

(56) References Cited

U.S. PATENT DOCUMENTS 5,710,504 A 1/1998 Pascual et al.
10,763,693 B2 9/2020 Morita
(Continued)

FOREIGN PATENT DOCUMENTS

JP 2009-247145 A 10/2009
WO 2015-105923 A1 7/2015

OTHER PUBLICATIONS

J. Cao, N. Schofield and A. Emadi, "Battery balancing methods: A comprehensive review," 2008 IEEE Vehicle Power and Propulsion Conference, Harbin, China, 2008, pp. 1-6, doi: 10.1109/VPPC.2008. 4677669. (Year: 2008).*
(Continued)

Primary Examiner — Daniel Cavallari
(74) Attorney, Agent, or Firm — Honigman LLP

(57) ABSTRACT

An in-vehicle backup power supply device includes a battery unit having a plurality of unit batteries connected in series and a discharge circuit configured to perform a first discharge operation for supplying power to a third conductive path based on a charge accumulated in the battery unit, a balance circuit performs a cell balancing operation on the battery unit, and a control unit controls the balance circuit, and the balance circuit is performs a second discharge operation for supplying power to the third conductive path based on a charge accumulated in a plurality of power
(Continued)

storage elements, and the control unit performs a first control for causing the balance circuit to perform the cell balancing operation and a second control for causing the balance circuit to perform the second discharge operation, and if a failure in which the first discharge operation cannot operate normally occurs, performs the second control.

8 Claims, 14 Drawing Sheets

(51) Int. Cl.
    *H02J 7/00*     (2006.01)
    *H02J 9/06*     (2006.01)

(52) U.S. Cl.
    CPC ............ *H02J 7/0063* (2013.01); *H02J 9/061* (2013.01); *H02J 2207/20* (2020.01)

(56) References Cited

U.S. PATENT DOCUMENTS

| | | | |
|---|---|---|---|
| 2013/0026994 A1* | 1/2013 | Morikawa | G01R 31/396 |
| | | | 320/134 |
| 2015/0244189 A1 | 8/2015 | Baba | |
| 2020/0059106 A1* | 2/2020 | Karlsson | H01M 10/425 |
| 2020/0189414 A1 | 6/2020 | Morita | |

OTHER PUBLICATIONS

International Search Report, Application No. PCT/JP2020/018760, dated Jun. 9, 2020. ISA/Japan Patent Office.

\* cited by examiner

IN-VEHICLE BACKUP POWER SUPPLY DEVICE

CROSS-REFERENCE TO RELATED APPLICATIONS

This application is the U.S. national stage of PCT/JP2020/018760 filed on May 11, 2020, which claims priority of Japanese Patent Application No. JP 2019-098237 filed on May 27, 2019, the contents of which are incorporated herein.

TECHNICAL FIELD

The present disclosure relates to an in-vehicle backup power supply device.

BACKGROUND

If a failed state leading to a stop of supply of power from a main power supply occurs in an in-vehicle power supply system, power is no longer supplied to a load, and the load can be no longer electrically operated. However, there is a strong demand for some loads to operate continuously, and thus a system which includes a separate dedicated backup power supply that is different from the main power supply is known as a configuration that meets such a demand. JP 2018-13136A and JP 2018-62253A disclose examples of this kind of power supply system.

However, if a dedicated backup power supply is provided only in order to perform a backup operation at the time of a failure, then this leads to an increase in size and weight of the hardware.

In view of this, the present disclosure suggests a technique with which a backup operation can be performed at the time of a failure without using a dedicated backup power supply.

SUMMARY

An in-vehicle backup power supply device according to the present disclosure is an in-vehicle backup power supply device in an in-vehicle power supply system, the in-vehicle backup power supply device including: a battery unit in which a plurality of unit batteries are connected in series; a discharge circuit configured to perform a first discharge operation for supplying power to a conductive path on a load side based on a charge accumulated in the battery unit; a balance circuit configured to perform a cell balancing operation on the battery unit; and a control unit configured to control the balance circuit, wherein the balance circuit is configured to perform a second discharge operation for supplying power to the conductive path on the load side based on a charge accumulated in a plurality of power storage elements, and the control unit performs a first control for causing the balance circuit to perform the cell balancing operation and a second control for causing the balance circuit to perform the second discharge operation, and if a failure occurs in which the first discharge operation is not normally performed, performs the second control.

Advantageous Effects of Invention

According to the present disclosure, a backup operation can be performed with a simple configuration without providing a dedicated configuration for backing up a battery unit.

DETAILED DESCRIPTION OF PREFERRED EMBODIMENTS

Figure 1:
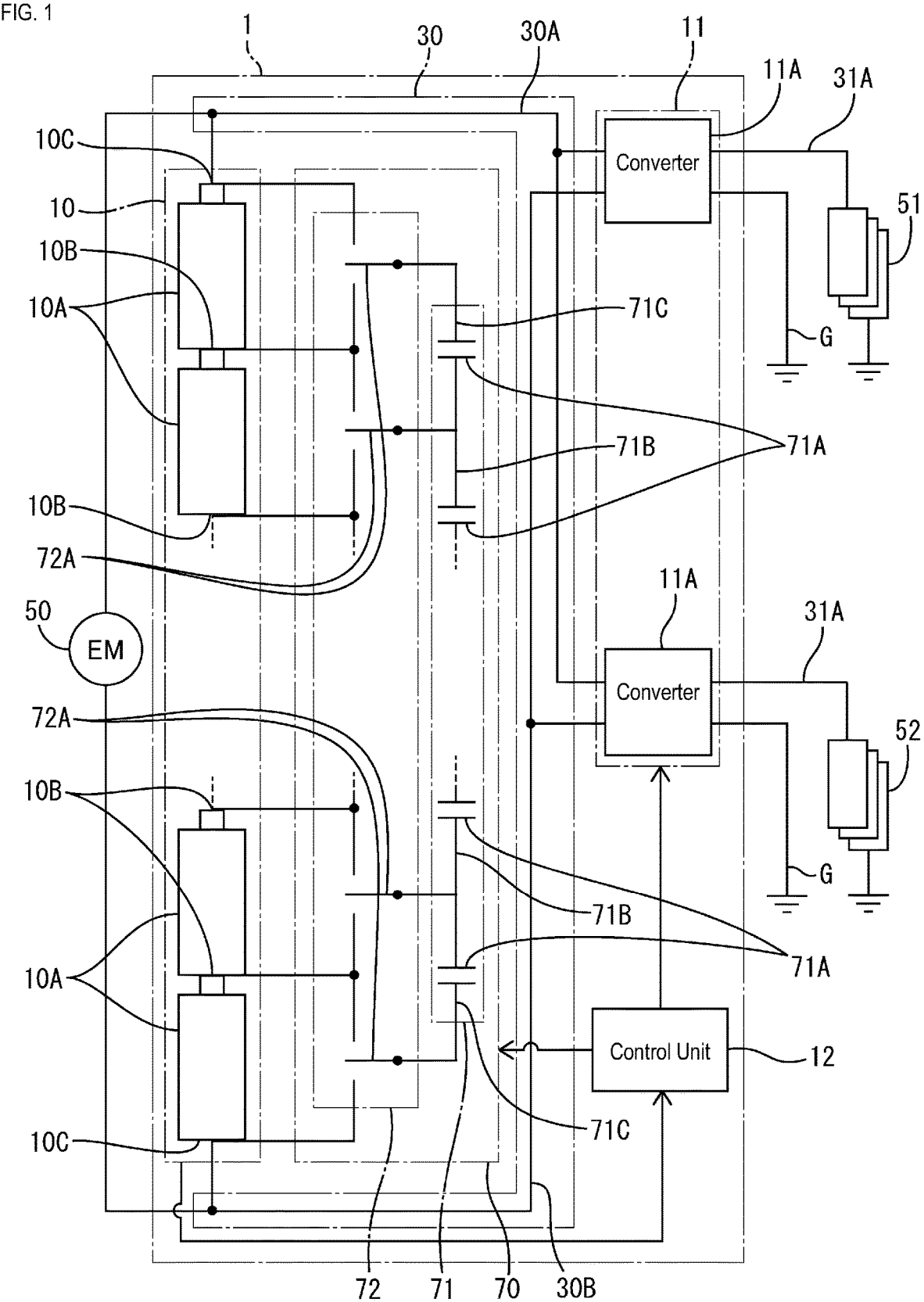
FIG. 1 is a circuit diagram schematically showing an in-vehicle backup power supply device according to a first embodiment, in which switch elements are in a non-connecting state.

First, embodiments of the present disclosure will be listed and described.

An in-vehicle backup power supply device according to the present disclosure is an in-vehicle backup power supply device in an in-vehicle power supply system, the in-vehicle backup power supply device including a battery unit in which a plurality of unit batteries are connected in series, a discharge circuit configured to perform a first discharge operation for supplying power to a conductive path on a load side based on a charge accumulated in the battery unit. An in-vehicle backup power supply device according to the present disclosure includes a balance circuit configured to perform a cell balancing operation on the battery unit, and a control unit configured to control the balance circuit. The balance circuit is configured to perform a second discharge operation for supplying power to the conductive path on the load side based on a charge accumulated in a plurality of power storage elements. The control unit performs a first control for causing the balance circuit to perform the cell balancing operation and a second control for causing the balance circuit to perform the second discharge operation, and if a failure occurs in which the first discharge operation is not normally performed, performs the second control. In this manner, with the in-vehicle backup power supply device according to the present disclosure, it is possible to perform a backup operation with a simple structure without providing a dedicated configuration for backing up the battery unit.

In the in-vehicle backup power supply device according to the present disclosure a plurality of the balance circuits, a configuration is also possible in which the battery unit includes a plurality of unit battery groups, the plurality of balance circuits correspond to the plurality of unit battery groups, and the control unit operates each of the balance circuits independently.

With this configuration, if one balance circuit can no longer operate, the operation of another balance circuit can be continued, and thus it is possible to perform the backup operation more reliably.

In the in-vehicle backup power supply device according to the present disclosure, a configuration is also possible in which the discharge circuit includes a converter for stepping up or down a voltage that is input and outputting the resultant voltage, and when performing the second control, the control unit operates the converter such that the converter steps up or down an input voltage based on the power supplied from the power storage element, and applies an output voltage to the conductive path on the load side.

With this configuration, it is possible to supply power of a desired magnitude to the conductive path on the load side, based on the power supplied from the power storage element. In particular, if the power from the power storage element is stepped up by the converter, it is possible to effectively use the power accumulated in the power storage element.

In the in-vehicle backup power supply device according to the present disclosure, a configuration is also possible in which the discharge circuit includes a converter configured to step up or down a voltage that is input and outputting the resultant voltage, and when performing the first control, the control unit operates the converter such that the converter steps up or down an input voltage based on the power supplied from the power storage element and supplies the power to the battery unit side.

With this configuration, if the balance circuit performs the cell balancing operation, since the power supplied from the power storage unit is stepped up by the converter, it is possible to suppress a case in which a current flowing between the power storage unit and the battery unit decreases when the cell balancing operation has progressed to some extent. In this manner, it is possible to positively cause a current to flow from the power storage unit toward the battery unit, and shorten the time required for the balancing operation.

In the in-vehicle backup power supply device according to the present disclosure, a configuration is also possible in which the discharge circuit includes a converter configured to step up or down and output a voltage that is input, and when performing the first control, the control unit operates the converter to step up or down an input voltage based on the power supplied from the power storage element and supply the power to the battery unit side, and when performing the second control, the control unit operates the converter to step up or down an input voltage based on the power supplied from the power storage element and supply the power to the conductive path on the load side.

With this configuration, if the balance circuit performs the second discharge operation, it is possible to supply the power of a desired magnitude, based on the power supplied from the power storage unit to the conductive path on the load side. In particular, if the input voltage based on the power supplied from the power storage unit is stepped up by the converter, it is possible to effectively use the power accumulated in the power storage unit. Also, when performing the cell balancing operation, by the input voltage based on the power supplied from the power storage unit being stepped up by the converter, a decrease of a current flowing between the power storage unit and the unit batteries is suppressed when the cell balancing operation has progressed to some extent. Also, exchange of current can be positively performed between the power storage unit and the unit batteries. In this manner, it is possible to shorten the time required for the balancing operation.

In the in-vehicle backup power supply device according to the present disclosure, the battery unit includes end electrode portions and inter-battery electrode portions between the unit batteries. The balance circuit includes the power storage unit in which the plurality of power storage elements are connected in series, and a switch unit provided with a plurality of switch elements. The power storage unit includes an end element electrode portion and an inter-element electrode portion between the power storage elements. The switch elements respectively correspond to the unit batteries. The inter-element electrode portion or the end element electrode portion that corresponds to each unit battery is electrically connected to the high potential electrode or the low potential electrode of the unit battery to which each switch element corresponds. When performing the first control, the control unit operates the switch elements respectively corresponding to the unit batteries such that the high potential electrode and the low potential electrode of each unit battery are alternately and electrically connected to the inter-element electrode portion or the end element electrode portion that corresponds to the unit battery. When performing the second control, the control unit can operate the switch elements such that at least two of the inter-battery electrode portions or the end electrode portions are respectively and electrically connected to the inter-element electrode portion or the end element electrode portion.

With this configuration, at least the two of the inter-battery electrode portions or the end electrode portions are respectively and electrically connected to the inter-element electrode portion or the end element electrode portion, and thus it is possible to backup not only the battery unit but also the individual unit batteries.

In the in-vehicle backup power supply device according to the present disclosure, the balance circuit includes a power storage unit formed by one or more power storage elements and a switch unit provided with a plurality of the switch elements. The switch elements respectively correspond to the unit batteries. One end element electrode portion of the power storage unit is electrically connected to the high potential electrode of the unit battery to which the switch element corresponds, and the other end element electrode portion of the power storage unit is electrically connected to the low potential electrode of the unit battery to which the switch element corresponds. When performing the first control, with respect to one unit battery, the control unit electrically connects the high potential electrode to one end element electrode portion of the power storage unit. Also, the control unit controls the plurality of switch elements to perform an operation for electrically connecting the low potential electrode to the other end element electrode portion of the power storage unit, alternately on each of the plurality of unit batteries. When performing the second control, the control unit can operate the plurality of switch elements such that the high and low potential electrodes of the unit batteries and the end element electrode portions are not connected to each other.

With this configuration, since the cell balancing operation can be performed using one power storage element, it is possible to reduce the size of the power supply device itself.

In the in-vehicle backup power supply device according to the present disclosure, the balance circuit includes a power storage unit formed by one or more power storage element and a switch unit provided with a plurality of switch elements. The switch elements respectively correspond to the unit batteries. One end element electrode portion of the power storage unit is electrically connected to the high potential electrode of the unit battery to which the switch element corresponds to via the converter, and the other end element electrode portion of the power storage unit is electrically connected to the low potential electrode of the unit battery to which the switch element corresponds to via the converter. When performing the first control, with respect to one unit battery, the control unit electrically connects the high potential electrode to the one end element electrode portion of the power storage unit via the converter. Also, the control unit controls the plurality of switch elements to perform the operation for electrically connecting the other end element electrode portion of the power storage unit to the low potential electrode via the converter, alternately on each of the plurality of unit batteries. Then, the control unit operates the converters to supply power to whichever of the unit batteries or the power storage units has the lower voltage thereacross. When performing the second control, the control unit can operate the plurality of switch elements such that the high and low potential electrodes of the unit battery and the end element electrode portion are not connected to each other.

With this configuration, at the time of cell balancing operation, since the unit batteries are alternately connected to the converters through the switch units, it is possible to make one converter handle the plurality of unit batteries, and simplify the configuration of the power supply device.

In the in-vehicle backup power supply device according to the present disclosure, the balance circuit includes a power storage unit formed by one or more power storage elements and a switch unit provided with the plurality of switch elements. The switch elements respectively correspond to the unit batteries. The high and low potential electrodes of the unit battery to which each switch element corresponds are electrically connected to the converter via the conductive path on the battery unit side. A power storage unit switch unit is provided, which collectively switches electrical connection of the two end element electrode portions of the power storage unit to either the conductive path on the battery unit side or the conductive path on the load side. When performing the first control, the control unit operates the power storage unit switch unit to collectively switch electrical connection of the two end element electrode portions to the conductive path on the load side, and, with respect to one unit battery, electrically connects the high potential electrode to one end element electrode portion of the power storage unit via the converter. Also, the control unit operates the plurality of switch elements to perform the operation for electrically connecting the low potential electrode to the other end element electrode portion of the power storage unit via the converter, alternately on each of the plurality of unit batteries. Then, the control unit operates the converters to supply power to whichever of the unit batteries or the power storage units has the lower voltage thereacross. When performing the second control, the control unit controls the power storage unit switch unit such that the two end element electrode portions are collectively and electrically connected to the conductive path on the battery unit side. The control unit can operate the plurality of switch elements such that the high and low potential electrodes of the unit batteries and the conductive paths on the battery unit side are not connected to each other.

With this configuration, since the power storage unit switch unit collectively switches electrical connection of the two end element electrode portions to the conductive path on the battery unit side or the conductive path on the load side, it is possible to prevent a case in which the power storage unit is connected to both the conductive path on the battery unit side and the conductive path on the load side. In this manner, it is possible to suppress a case in which a malfunction occurs in the converter.

First Embodiment

Configuration of Power Supply Device

An in-vehicle backup power supply device 1 according to a first embodiment (hereinafter also referred to as "power supply device 1") is used as power supply for outputting the power for driving an electromotive device (e.g., motor) in vehicles such as hybrid cars or electric cars (EV (Electric Vehicle)). As shown in FIG. 1, the power supply device 1 includes a battery unit 10, a discharging circuit 11, a balance circuit 70, and a control unit 12. In the battery unit 10, a plurality of unit batteries 10A are electrically connected in series. Batteries such as lithium-ion batteries are used for the unit batteries 10A. The battery unit 10 includes inter-battery electrode portions 10B and end electrode portions 10C. The inter-battery electrode portions 10B are portions at which adjacent unit batteries 10A are electrically connected in series. The end electrode portions 10C are the high potential electrode of the unit battery 10A located at the highest potential in the battery unit 10 and the low potential electrode of the unit battery 10A located at the lowest potential in the battery unit 10.

Each of the end electrode portions 10C of the battery unit 10 is electrically connected to a power generation device 50 mounted in the vehicle, and the battery unit 10 can be charged by the power generation device 50. The power generation device 50 is configured as a known in-vehicle power generator, and can generate power through rotation of the rotational axis of an engine (not shown). When the power generation device 50 operates, power generated by the power generation device 50 is rectified, and then supplied to the battery unit 10 as DC power.

The discharge circuit 11 includes a plurality of converters 11A. The converters 11A are, for example, configured as known bi-directional step up/down DC-DC converters provided with semiconductor switching elements and inductors, and the operation is controlled by the control unit 12. The converters 11A step up or down a voltage that is input and output the resultant voltage. The converters 11A are electrically connected to the battery unit 10 via a first circuit unit 30 that is a conductive path on the battery unit side. The first circuit unit 30 constitutes a power path between the discharge circuit 11 and the battery unit 10. The first circuit unit 30 includes a first conductive path 30A and a second conductive path 30B. The converters 11A are electrically connected to the highest potential electrode in the battery unit 10 via the first conductive path 30A. The converters 11A are electrically connected to the lowest potential electrode in the battery unit 10 via the second conductive path 30B. The potential difference between the first conductive path 30A and the second conductive path 30B is input to each converter 11A as an input voltage.

A first load 51 and a second load 52 are electrically connected to the respective converters 11A via third conductive paths 31A that are conductive paths on the load side. Although the first load 51 and the second load 52 have similar functions, this is merely a typical example, and there is no limitation to this configuration. Also, a ground path G that is the conductive path on the load side is electrically connected to each converter 11A.

The first load 51 is, for example, an electric power steering system in which an electrical component such as a motor operates by receiving power supply from the battery unit 10 via the converter 11A. The second load 52 is an electric power steering system having a configuration and function similar to the first load 51. When there is an abnormality in the first load 51, the second load 52 operates instead of the first load 51, and thus the function of the first load 51 can be maintained even if there is an abnormality in the first load 51.

The one converter 11A to which the first load 51 is electrically connected can perform a discharge operation in which, when a first condition is satisfied, the control unit 12 steps up or down the potential difference between the first conductive path 30A and the second conductive path 30B as the input voltage and apply the output voltage to the third conductive path 31A, for example. That the first condition is satisfied may mean that an ignition switch (not shown) provided in the vehicle is switched from off to on, for example.

Also, when the first load 51 can no longer operate normally, the control unit 12 causes the other converter 11A to which the second load 52 is electrically connected to execute the discharge operation, and supply power to the second load 52 via the third conductive path 31A. The control unit 12 can obtain the voltage value from a detection unit that detects the voltage value and current value of the third conductive path 31A that is connected to the first load 51, and based on this voltage value, determine whether the first load 51 can no longer operate normally.

The balance circuit 70 includes the power storage unit 71 and the switch unit 72. The power storage unit 71 is formed by a plurality of power storage elements 71A that can temporarily store power being electrically connected in series. Electric double layer capacitors or the like are used for the power storage elements 71A, for example. The power storage unit 71 includes inter-element electrode portions 71B and end element electrode portions 71C. The inter-element electrode portions 71B are portions at which the adjacent power storage elements 71A are electrically connected in series. The end element electrode portions 71C are the high potential electrode of the power storage element 71A located at the highest potential in the power storage unit 71 and the low potential electrode of the power storage element 71A located at the lowest potential in the power storage unit 71.

The switch unit 72 is provided with a plurality of switch elements 72A. MOSFETs (Metal Oxide Semiconductor Field Effect Transistors) or the like are used for the switch elements 72A, for example. One inter-element electrode portion 71B or end element electrode portion 71C is electrically connected to each switch element 72A. The switch elements 72A respectively correspond to the unit batteries 10A. The switch elements 72A can connect the inter-element electrode portion 71B or end element electrode portion 71C connected thereto to either the high potential electrode or the low potential electrode of the unit battery 10A that corresponds to it, by being controlled by the control unit 12. The switch elements 72A can also bring the switch elements 72A into a state in which the switch elements 72A do not connect any of the inter-element electrode portion 71B or end element electrode portion 71C connected thereto to the high and low potential electrodes of the unit battery 10A that correspond thereto (hereinafter also referred to as "non-connecting state"), by being controlled by the control unit 12.

The control unit 12 is constituted mainly by a microcomputer, for example, and includes a computation device such as a CPU (Central Processing Unit), a memory such as a ROM (Read Only Memory) or a RAM (Random Access Memory), an A/D converter and the like. The control unit 12 can monitor the potential difference between the two ends of the unit batteries 10A of the battery unit 10, and the connecting state of the unit batteries 10A to the inter-battery electrode portions 10B and the end electrode portions 10C. The control unit 12 can monitor the potential difference between the two ends of the power storage elements 71A of the power storage unit 71.

Next, the operation of the power supply device 1 will be described.

First Discharge Operation

When the ignition switch is switched from off to on in the vehicle in which the power supply device 1 is mounted, power is supplied from the battery unit 10 to the converters 11A of the discharge circuit 11 via the first circuit unit 30. In the discharge circuit 11, the control unit 12 starts the operation of the one converter 11A which is electrically connected to the first load 51, and the operation of the other converter 11A which is electrically connected to the second load 52 is maintained in a stopped state. In this manner, the one converter 11A performs the first discharge operation for supplying power to the third conductive path 31A that is the conductive path on the load side.

If the first load 51 can no longer operate normally, the control unit 12 stops the operation of the one converter 11A, and starts the operation of the other converter 11A to which the second load 52 is electrically connected. In this manner, the other converter 11A performs the first discharge operation for supplying power to the third conductive path 31A. Specifically, the control unit 12 determines whether the first load 51 can no longer operate normally, based on the voltage value from the detection unit that detects the voltage value and current value of the third conductive path 31A that is connected to first load 51. If the control unit 12 determines that the first load 51 can no longer operate normally, the control unit 12 stops the operation of the one converter 11A and starts the operation of the other converter 11A. In this manner, the power is supplied from the other converter 11A to the second load 52.

Active Cell Balancing operation

The amount of power accumulated in the unit batteries 10A of the battery unit 10 depends on the temperature and deterioration state of the unit batteries 10A, and thus varies among the unit batteries 10A. To eliminate this variation, the balance circuit 70 executes an active cell balancing operation (hereinafter also referred to as "cell balancing operation"). The control unit performs a first control to cause the balance circuit 70 to perform the cell balancing operation.

The first control is a control performed by the control unit 12 for causing the plurality of switch elements 72A to alternately repeat a first operation and a second operation. The first operation is an operation (see FIG. 2) in which the control unit 12 electrically connects the high potential electrodes of the unit batteries 10A to which the switch elements 72A correspond, to the inter-element electrode portion 71B or the end element electrode portion 71C that are electrically connected to those switch elements 72A. Also, the second operation is an operation (see FIG. 3) in which the control unit 12 electrically connects the inter-element electrode portions 71B and the end element electrode portion 71C that are electrically connected to those switch elements 72A to the low potential electrodes. The length of the time period of the first operation and the length of the time period of the second operation may be the same or different as necessary. Between the first operation and the second operation, a fixed non-conduction time in the non-connecting state (see FIG. 1) may be provided, in which neither the inter-element electrode portion 71B nor the end element electrode portion 71C is electrically connected to any of the inter-battery electrode portions 10B and the end electrode portions 10C. The length of the non-conduction time can be set as necessary.

Figure 2:
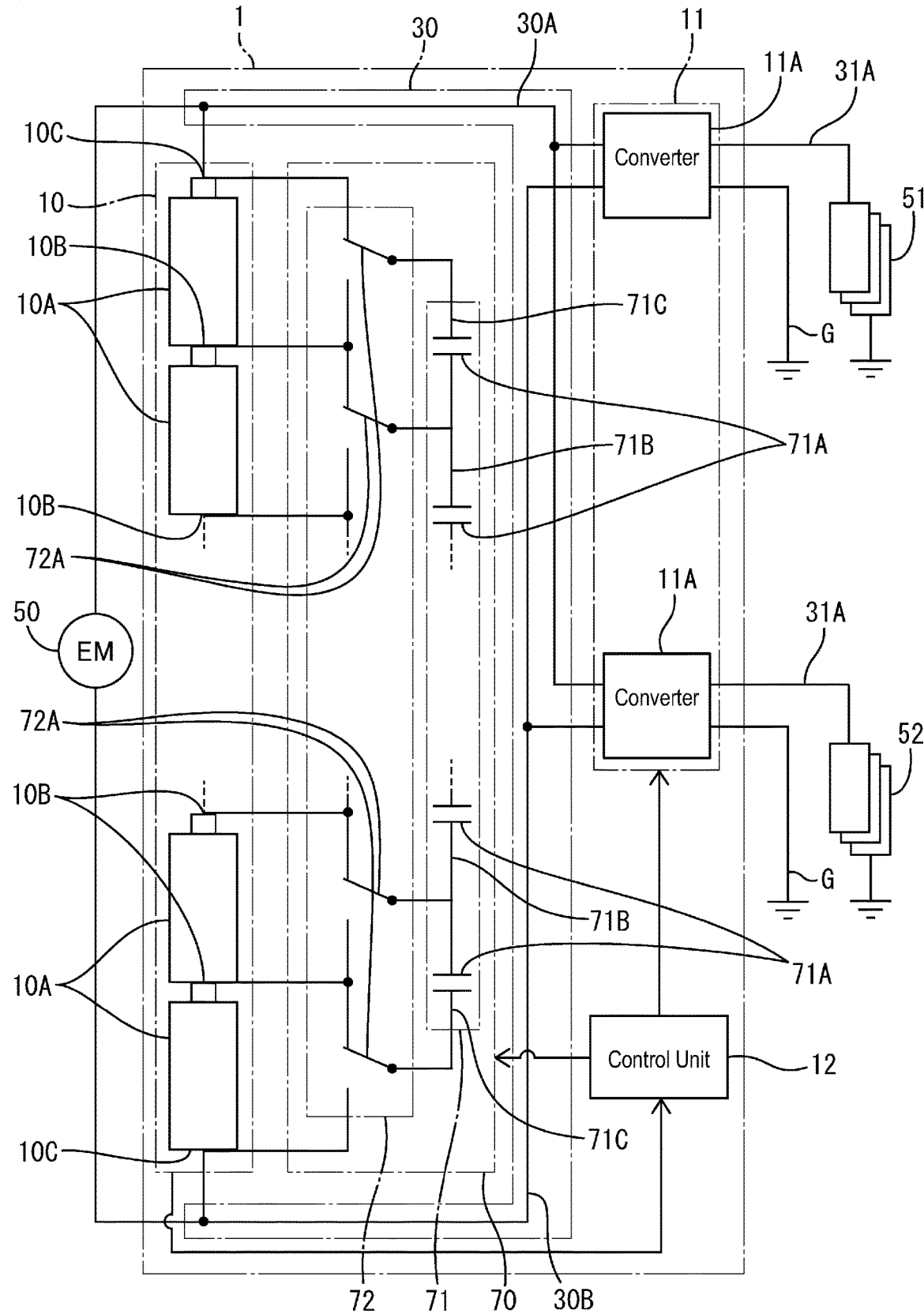
FIG. 2 is a circuit diagram schematically showing the in-vehicle backup power supply device according to the first embodiment, in which the switch elements are performing a first operation.

When the switch elements 72A of the switch unit 72 perform the first operation, the power storage elements 71A of the power storage unit 71 are respectively connected in parallel to the unit batteries 10A, except for the lowest potential unit battery 10A of the battery unit 10 (see FIG. 2). The movement of the charge between the unit batteries 10A and the power storage elements 71A depends on the voltage at the unit batteries 10A and the power storage elements 71A. Specifically, when looking at just one unit battery 10A and one power storage element 71A that is connected to this unit battery 10A in parallel, if the voltage of this unit battery 10A is higher than the voltage of this power storage element 71A, the charge moves from the unit battery 10A to the power storage element 71A to charge the power storage element 71A. On contrary, if the voltage of the power storage element 71A is higher than the voltage of the unit battery 10A, the charge moves from the power storage element 71A to the unit battery 10A to charge the unit battery 10A. This holds true also for the other unit batteries 10A and the other power storage elements 71A connected to the respective unit batteries 10A in parallel.

Figure 3:
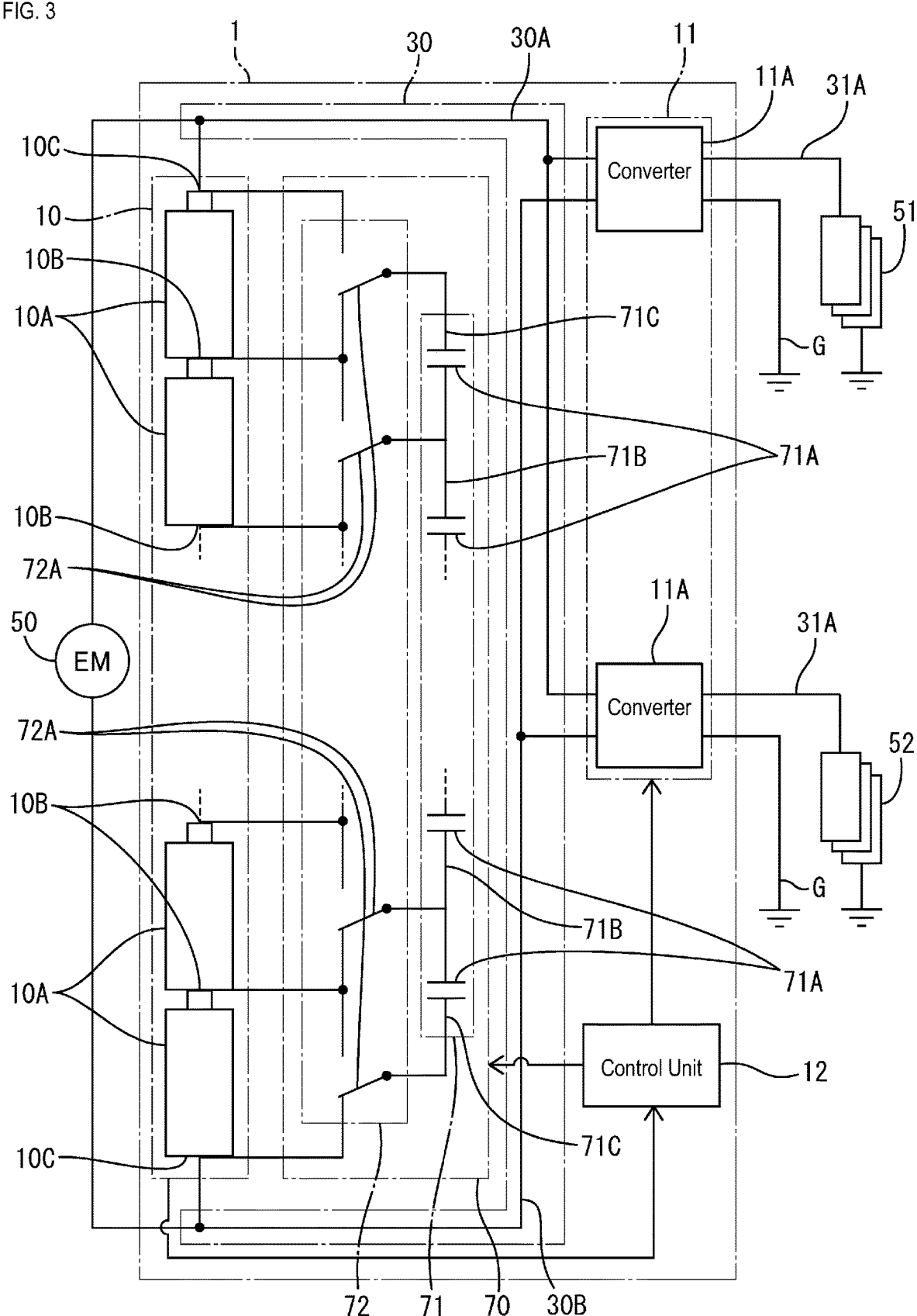
FIG. 3 is a circuit diagram schematically showing the in-vehicle backup power supply device according to the first embodiment, in which the switch elements are performing a second operation.

When the switch elements 72A of the switch unit 72 perform the second operation, the power storage elements 71A of the power storage unit 71 are respectively connected in parallel to the unit batteries 10A except the highest potential unit battery 10A of the battery unit 10 (see FIG. 3). The movement of the charge between the unit batteries 10A and the power storage elements 71A varies depending on the magnitude of the voltages of the unit batteries 10A and the power storage elements 71A. Specifically, when looking at just one unit battery 10A and one power storage element 71A that is connected to this unit battery 10A in parallel, if the voltage of the unit battery 10A is higher than the voltage of the power storage element 71A, the charge moves from the unit battery 10A to the power storage element 71A to charge the power storage element 71A. On contrary, if the voltage of the power storage element 71A is higher than the voltage of the unit battery 10A, the charge moves from the power storage element 71A to the unit battery 10A to charge the unit battery 10A. This holds true also for the other unit batteries 10A and the other power storage elements 71A connected in parallel to the respective unit batteries 10A. In this manner, in the power supply device 1, through the first control performed by the control unit 12, the switch elements 72A alternately repeat the first and second operations, and execute the cell balancing operation.

Figure 4:
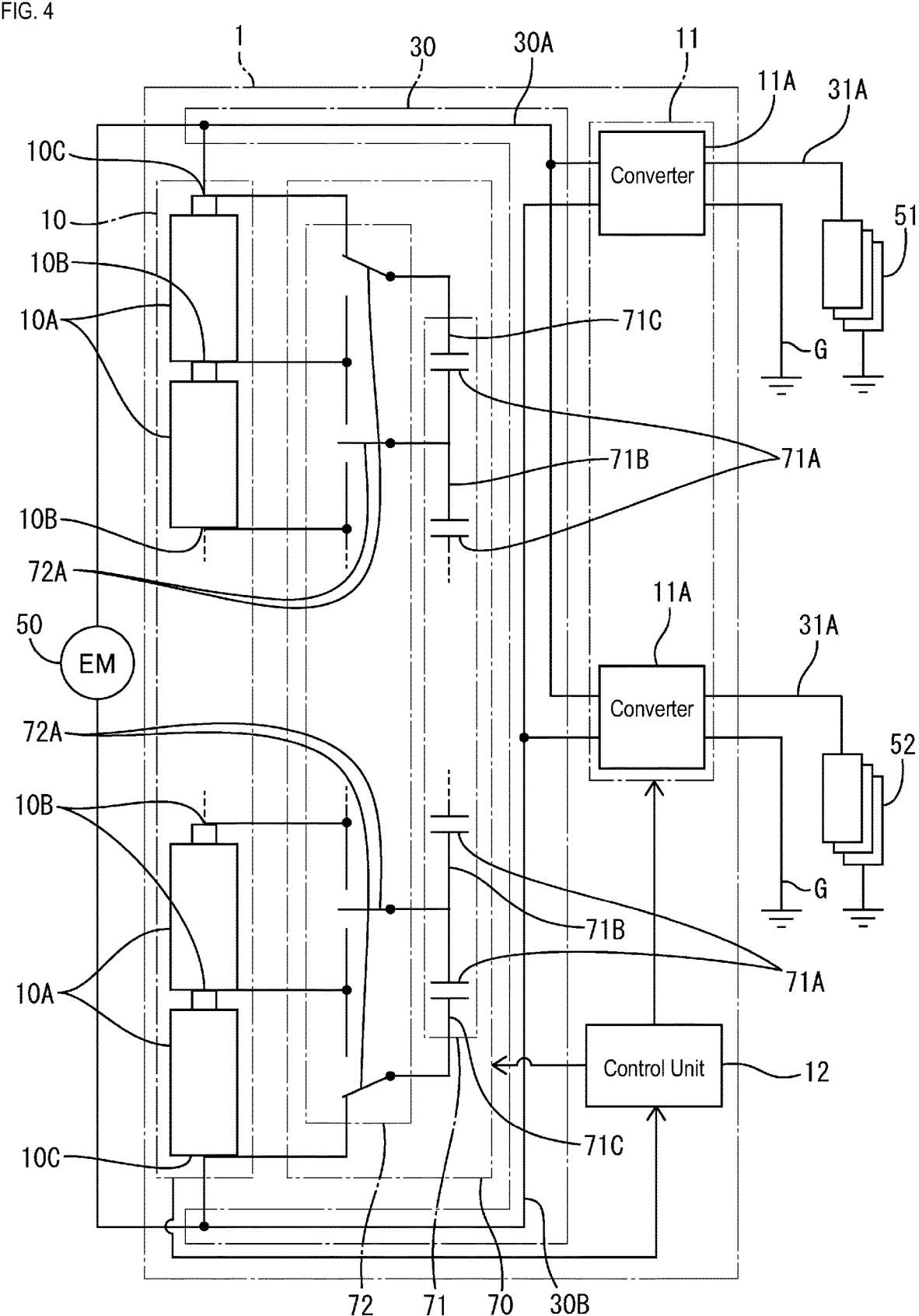
FIG. 4 is a circuit diagram schematically showing the in-vehicle backup power supply device according to the first embodiment, in which a balance circuit is performing a second discharge operation.

For example, when the control unit 12 determines that the difference between the potential differences of the two ends of the unit batteries 10A is less than or equal to a predetermined value (in other words, the potential differences between the two ends of the unit batteries 10A are similar), the device 1 shifts to the state shown in FIG. 4 to charge the power storage unit 71. After that, the balance circuit 70 ends the cell balancing operation. When the cell balancing operation ends, the switch elements 72A enter the non-connecting state (see FIG. 1). In this manner, the power storage elements 71A are maintained in a state in which power is accumulated.

Second Discharge Operation

If there is a failure (hereinafter also referred to as a "failed state") in which the first discharge operation cannot be performed normally, the control unit 12 performs the second control for causing the balance circuit 70 to perform the second discharge operation. A failed state may be given e.g. by an electrical connection between the adjacent unit batteries 10A of the battery unit 10 entering an open state, the unit batteries 10A no longer being capable of discharging normally, and the like.

In the failed state, as shown in FIG. 4, in the switch element 72A (hereinafter also referred to as "high potential switch element 72A") that is connected to the highest potential unit battery 10A in parallel, the control unit 12 electrically connects the end electrode portion 10C and the end element electrode portion 71C to each other. Also, in the switch element 72A (hereinafter also referred to as "low potential switch element 72A") that is connected in parallel to the unit battery 10A on the lowest potential side, the control unit 12 electrically connects the end electrode portion 10C and the end element electrode portion 71C to each other. Also, the control unit 12 brings the switch elements 72A other than the high potential switch element 72A and the low potential switch element 72A into the non-connecting state. Thus, the charge accumulated in the power storage unit 71 is supplied to the discharge circuit 11 via the first circuit unit 30.

Figure 5:
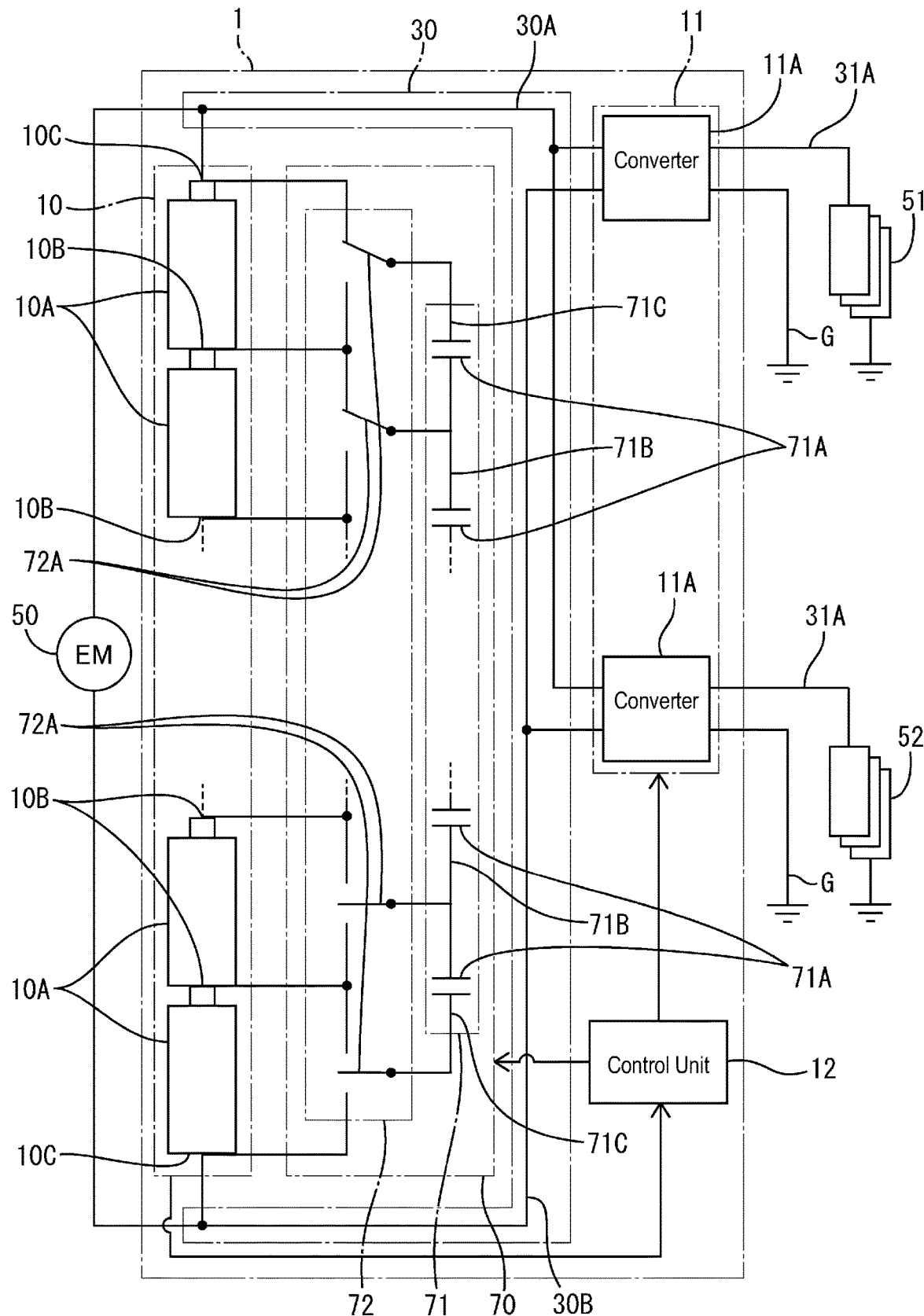
FIG. 5 is a circuit diagram schematically showing the in-vehicle backup power supply device according to the first embodiment, in which an end element electrode portion is electrically connected to an end electrode portion of a unit battery that can no longer discharge normally, and an inter-element electrode portion that is adjacent to the end element electrode portion is electrically connected to an inter-battery electrode portion that is adjacent to the end electrode portion.

Also, as shown in FIG. 5, if the highest potential unit battery 10A can no longer discharge normally, the control unit 12 electrically connects the end electrode portion 10C and the end element electrode portion 71C to each other. Also, the control unit 12 may operate the switch element 72A to electrically connect the inter-battery electrode portion 10B that is adjacent to the end electrode portion 10C to the inter-element electrode portion 71B that is adjacent to the end element electrode portion 71C. In this manner, since the power supply device 1 can form a circuit that passes through the power storage element 71A while bypassing the unit battery 10A that can no longer discharge normally, it is possible to backup the individual unit batteries 10A.

Next, the effects of this configuration will be illustrated.

The in-vehicle backup power supply device 1 of the present disclosure is included in the in-vehicle power supply system provided with the battery unit 10 in which the plurality of unit batteries 10A are connected in series, and the discharge circuit 11 that performs the first discharge operation for supplying power to the third conductive path 31A based on the charge accumulated in the battery unit 10. The in-vehicle backup power supply device 1 of the present disclosure is provided with the balance circuit 70 for performing the cell balancing operation on the battery unit 10, and the control unit 12 for controlling the balance circuit 70. The balance circuit 70 is configured to perform the second discharge operation for supplying power to the third conductive path 31A based on the charge accumulated in the plurality of power storage elements 71A. The control unit 12 performs the first control for causing the balance circuit 70 to perform the cell balancing operation and the second control for causing the balance circuit 70 to perform the second discharge operation. The control unit 12 performs the second control when there is a failure in which the first discharge operation is not normally performed. In this manner, the in-vehicle backup power supply device 1 of the present disclosure can perform the backup operation with a simple structure without providing a dedicated configuration for backing up the battery unit 10.

In the in-vehicle backup power supply device 1 of the present disclosure, the battery unit 10 includes the end electrode portions 10C and the inter-battery electrode portions 10B between the unit batteries 10A. The balance circuit 70 includes the power storage unit 71 in which the plurality of power storage elements 71A are connected in series, and the switch unit 72 provided with the plurality of switch elements 72A. The power storage unit 71 includes the end element electrode portions 71C and the inter-element electrode portions 71B between the power storage elements 71A, and the switch elements 72A respectively correspond to the unit batteries 10A. The high potential electrode or the low potential electrode of the unit battery 10A to which each switch element 72A corresponds is electrically connected to the inter-element electrode portion 71B or the end element electrode portion 71C which corresponds to each unit battery 10A. When performing the first control, the control unit 12 operates the switch elements 72A that corresponds to the unit batteries 10A such that the inter-element electrode portion 71B or the end element electrode portion 71C that corresponds to the unit battery 10A is alternately and electrically connected to the high and low potential electrodes of the unit battery 10A. When performing the second control, the control unit 12 operates the switch elements 72A such that at least two of the inter-battery electrode portions 10B or the end electrode portions 10C are electrically connected to the inter-element electrode portions 71B or the end element electrode portions 71C, respectively.

With this configuration, at least two of the inter-battery electrode portions 10B or the end electrode portions 10C are electrically connected to the inter-element electrode portions 71B or the end element electrode portions 71C, respectively. For this reason, it is possible to backup not only the battery unit 10 but also the individual unit batteries 10A.

The discharge circuit 11 of the in-vehicle backup power supply device 1 of the present disclosure includes the converters 11A for stepping up or down the voltage that is input and outputting the resultant voltage. When performing the second control, the control unit 12 operates the converters 11A to step up or down the input voltage based on the power supplied from the power storage element 71A and supply the power to the third conductive path 31A.

With this configuration, it is possible to supply the power of the desired magnitude to the third conductive path 31A based on the power supplied from the power storage elements 71A. Specifically, when stepping up the power supplied from the power storage elements 71A through the converters 11A, the power accumulated in the power storage elements 71A can be effectively used.

Second Embodiment

Figure 6:
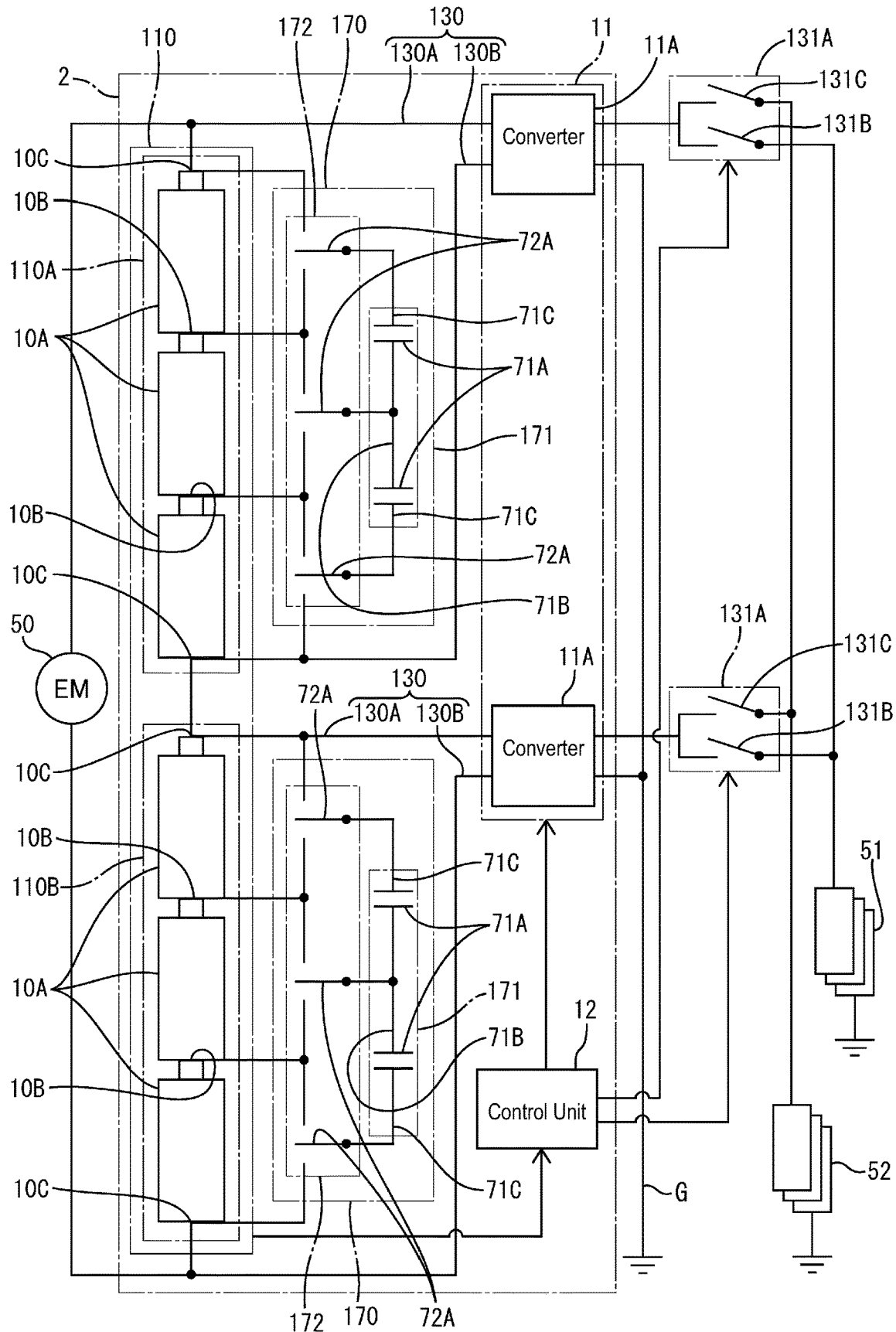
FIG. 6 is a circuit diagram schematically showing an in-vehicle backup power supply device according to a second embodiment, in which the switch elements are in a non-connecting state.

Next, an in-vehicle backup power supply device 2 (hereinafter also referred to as "power supply device 2") according to a second embodiment will be described with reference to FIG. 6. The power supply device 2 is different from the power supply device 1 of the first embodiment in that a plurality of the balance circuits 170 are included, the balance circuits 170 respectively correspond to unit battery groups 110A and 110B formed by dividing the battery unit 110, the configuration of a third conductive path 131A, the configuration of a first circuit unit 130, and the like. The constituent elements that are same as the first embodiment are given the same reference numerals, and description of their structures, operations, and effects will be omitted.

Configuration of Power Supply Device

The battery unit 110 is formed by a plurality of unit batteries 10A being connected in series. The battery unit 110 includes the plurality of unit battery groups 110A and 110B.

The balance circuits 170 are provided respectively corresponding to the unit battery groups 110A and 110B. The configuration of the electrical connection between the unit battery groups 110A and 110B and the balance circuits 170 is the same as the first embodiment. Each balance circuit 170 includes a power storage unit 171 and a switch unit 172. The power storage unit 171 is different from the power storage unit 71 of the first embodiment only in the number of power storage elements 71A and the number of inter-element electrode portions 71B. The switch unit 172 is different from the switch unit 72 of the first embodiment only in the number of switch elements 72A.

The battery groups 110A and 110B of the battery unit 110 are electrically connected to the converters 11A via the first circuit units 130, respectively. Each first circuit unit 130 constitutes a power path between the discharge circuit 11 and the battery unit 110. The first circuit unit 130 is provided with a first conductive path 130A and a second conductive path 130B. The one converter 11A is electrically connected to the highest potential electrode in the unit battery group 110A of the battery unit 110 via the first conductive path 130A. This converter 11A is electrically connected to the lowest potential electrode in the unit battery group 110A of the battery unit 110 via the second conductive path 130B. The other converter 11A is electrically connected to the highest potential electrode in the unit battery group 110B of the battery unit 110 via the first conductive path 130A. This converter 11A is electrically connected to the lowest potential electrode in the unit battery group 110B of the battery unit 110 via the second conductive path 130B. The potential difference between the first conductive path 130A and the second conductive path 130B is input to the converters 11A as an input voltage.

The third conductive paths 131A that are the conductive paths on the load side are electrically connected to the respective converters 11A. The first load 51 and the second load 52 are electrically connected to the converters 11A via the third conductive paths 131A. Each third conductive path 131A includes a first load switch 131B and a second load switch 131C. MOSFETs or the like are used for the first load switch 131B and the second load switch 131C. The first load switches 131B are controlled by the control unit 12 and switch the current flow between the converters 11A and the first load 51 to the open state or the closed state. The second load switches 131C are controlled by the control unit 12 and switch the current flow between the converter 11A and the second load 52 to the open state or the closed state. Also, the ground path G that is the conductive path on the load side is electrically connected to each of the converters 11A.

Next, the operation of the power supply device 2 will be described.

First Discharge Operation

In the vehicle on which the power supply device 2 is mounted, when the ignition switch is switched from off to on, for example, power is supplied to the converters 11A of the discharge circuit 11 via the first circuit units 130 from the battery unit 110. The control unit 12 starts the operation of the converters 11A in the discharge circuit 11. Also, the first load switch 131B of each of the third conductive paths 131A is closed by the control unit 12, and the second load switch 131C is opened by the control unit 12 (not shown). In this manner, power is supplied from the converters 11A to the first load 51.

If the control unit 12 determines that the first load 51 can no longer normally operate, the control unit 12 turns the first load switch 131B from the closed state to the open state, and turns the second load switch 131C from the open state to the closed state (not shown). In this manner, power is supplied from the converters 11A to the second load 52.

If the control unit 12 determines that either of the balance circuits 170 can no longer operate normally based on the potential difference at the two ends of the power storage elements 71A of the power storage unit 71 or the like, the control unit 12 stops the operation of the converter 11A that corresponds to the balance circuit 170 that cannot operate normally. Also, the control unit 12 opens the first load switch 131B and the second load switch 131C of the third conductive path 131A that is electrically connected to this converter 11A. At this time, the control unit 12 continues the operation of the converter 11A to which the other balance circuit 170 is electrically connected. Also, the control unit 12 keeps the closed state of the first load switch 131B of the third conductive path 131A and the open state of the second load switch 131C that are electrically connected to this converter 11A. In this manner, even if either of the balance circuits 170 can no longer operate normally, power supply to the first load 51 can be maintained from the converter 11A to which the other balance circuit 170 is electrically connected.

Note that the control unit 12 may make the following determination. First, the control unit 12 determines whether either the unit battery group 110A or 110B of the battery unit 110 can no longer operate normally, based on the potential difference at both ends of the unit batteries 10A of the battery units 110 and the connecting state of the unit batteries 10A to the inter-battery electrode portions 10B and the end electrode portions 10C. Next, even if it is determined that either the unit battery group 110A or 110B can no longer operate normally, the control unit 12 may also stop the operation of the converter 11A that corresponds to the unit battery group 110A or 110B which cannot operate normally.

Active Cell Balancing Operation

The cell balancing operations of the balance circuits 170 of the unit battery groups 110A and 110B are similar to that of the balance circuit 70 of the first embodiment. The control unit 12 performs the first control to cause the balance circuits 170 to perform the cell balancing operation. For example, when the control unit 12 determines that the potential differences of the two ends of the unit batteries 10A are less than or equal to a predetermined value (in other words, the potential differences between the two ends of the unit batteries 10A become similar), the balance circuits 170 end the cell balancing operation. When the cell balancing operation ends, the switch elements 72A enter the non-connecting state (see FIG. 6). In this manner, the power storage elements 71A are maintained in a state in which power is accumulated.

Second Discharge Operation

When power is supplied to the third conductive paths 131A from either of the converters 11A, the power supply device 2 can keep up the first discharge operation by keeping up power supply to the first load 51 from this converter 11A. In the power supply device 2, when there is a failure in both unit battery groups 110A and 110B of the battery unit 10, the control unit 12 performs the second control to cause the balance circuits 170 to perform the second discharge operation. The second discharge operation performed by the balance circuits 170 of the unit battery groups 110A and 110B is similar to that of the balance circuit 70 of the first embodiment.

Next, the effects of this configuration will be illustrated.

The in-vehicle backup power supply device 2 of the present disclosure includes the plurality of balance circuits 170. The battery unit 110 includes the plurality of unit battery groups 110A and 110B. The plurality of unit battery groups 110A and 110B respectively corresponds to the plurality of balance circuits 170. The control unit 12 operates each of the balance circuits 170 independently.

With this configuration, even if one of the balance circuits 170 cannot operate normally, the operation of the other balance circuit 170 can be continued, and thus the backup operation can be more reliably performed.

Third Embodiment

Figure 7:
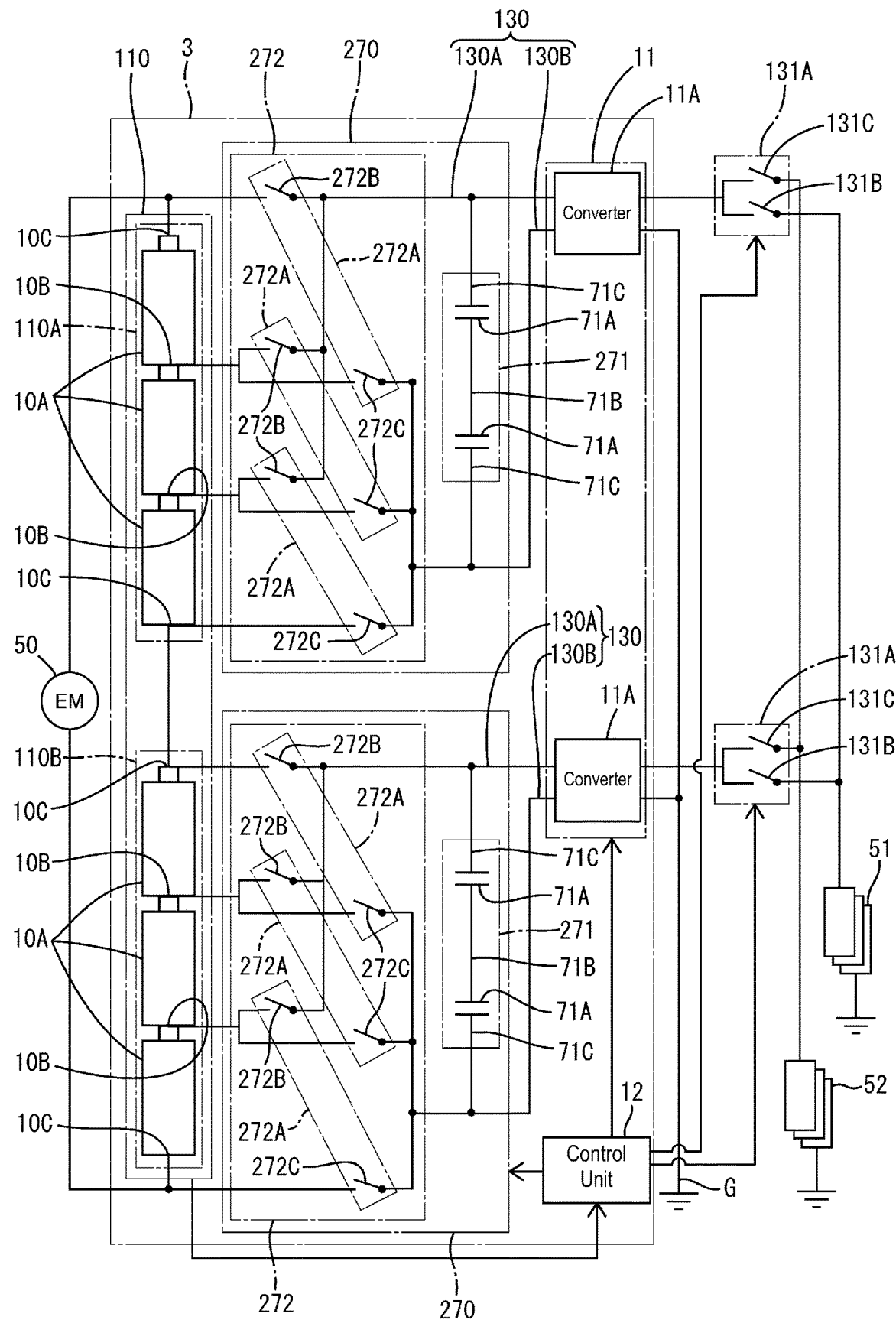
FIG. 7 is a circuit diagram schematically showing an in-vehicle backup power supply device according to a third embodiment, in which first switch elements and second switch elements are in the non-connecting state.
Figure 8:
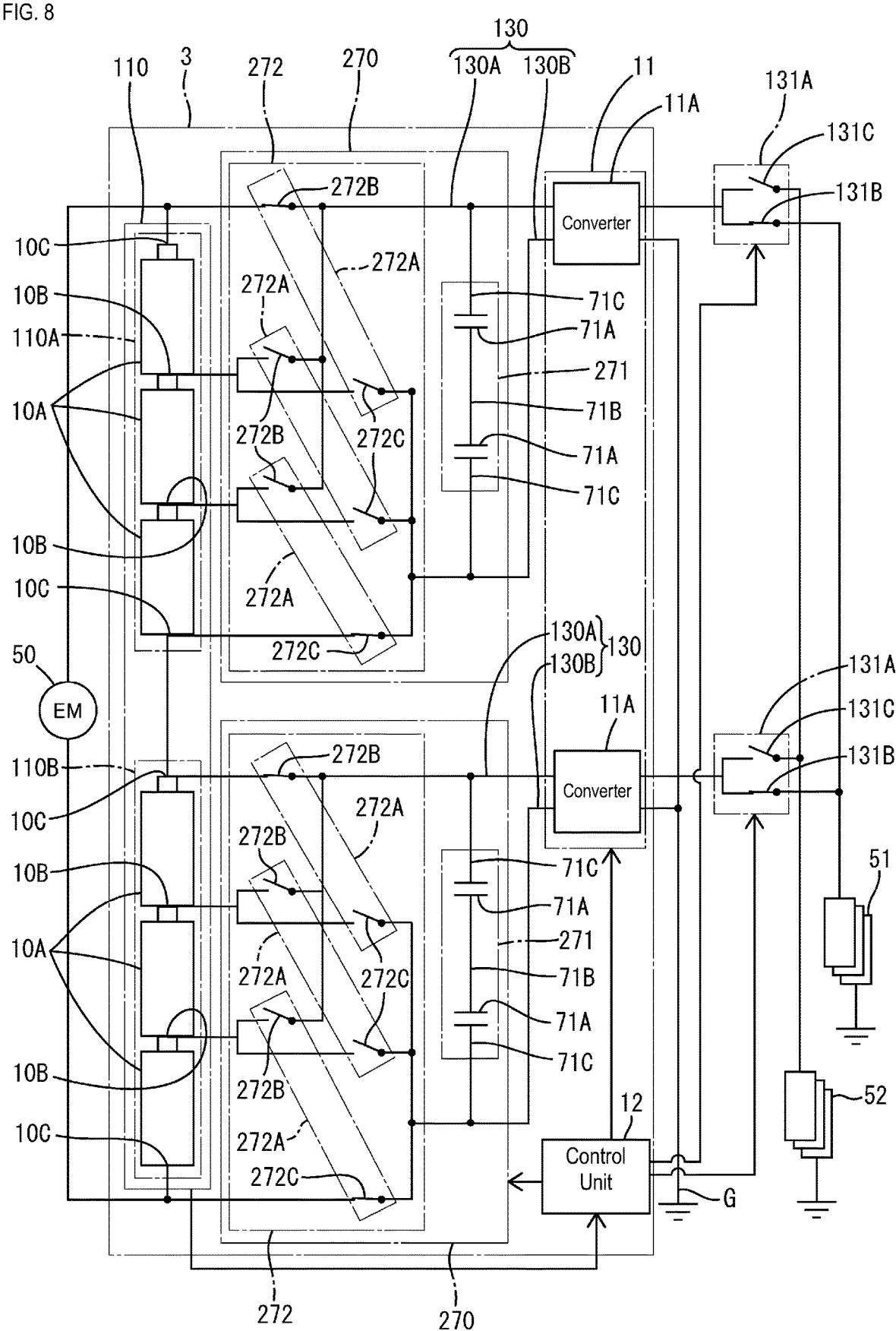
FIG. 8 is a circuit diagram schematically showing the in-vehicle backup power supply device according to the third embodiment, in which a first discharge operation is performed.

Next, an in-vehicle backup power supply device 3 (hereinafter also referred to as "power supply device 3") according to the third embodiment will be described with reference to FIGS. 7 to 9. The power supply device 3 is different from the second embodiment in the configuration of balance circuits 270, for example. The constituent elements that are the same as that of the second embodiment are given the same reference numerals, and description of their structures, operations, and effects will be omitted.

Configuration of Power Supply Device

The power supply device 3 is provided with a plurality of balance circuits 270. Each balance circuit 270 includes a switch unit 272 and a power storage unit 271. Each switch unit 272 includes a plurality of switch pairs 272A. Each switch pair 272A includes a first switch element 272B and a second switch element 272C. MOSFETs or the like are used for the first switch elements 272B and the second switch elements 272C. The power storage units 271 are different from the power storage units 171 of the second embodiment only in that the inter-element electrode portions 71B are not connected to the switch units 272.

The switch pairs 272A respectively correspond to the unit batteries 10A. Specifically, the first switch elements 272B of the switch pairs 272A are respectively and electrically connected to the high potential electrodes of the unit batteries 10A, and the second switch elements 272C of the switch pairs 272A are respectively and electrically connected to their low potential electrodes. In each of the unit battery groups 110A and 110B, the high potential electrodes of the unit batteries 10A are electrically connected to the first conductive path 130A of the first circuit unit 130 and the one end element electrode portion 71C of the power storage unit 271 via the first switch elements 272B. In each of the unit battery groups 110A and 110B, the low potential electrodes of the unit batteries 10A are electrically connected to the second conductive path 130B of the first circuit unit 130 and the other end element electrode portion 71C of the power storage unit 271 via the second switch elements 272C.

The control unit 12 is configured to monitor the potential difference at the two ends of the unit batteries 10A of the battery unit 110, the connecting state of the unit batteries 10A to the inter-battery electrode portions 10B and the end electrode portions 10C. The control unit 12 can monitor the potential difference between the two ends of the power storage elements 71A of the power storage unit 271.

Next, the operation of the power supply device 3 will be described.

First Discharge Operation

In the vehicle on which the power supply device 3 is mounted, when the ignition switch is switched from off to on, for example, the first switch elements 272B connected to the high potential electrodes of the unit battery groups 110A and 110B of the battery unit 110 and the second switch elements 272C connected to the low potential electrodes are closed. Also, the other first switch elements 272B and the second switch elements 272C are opened (see FIG. 8). Accordingly, power is supplied from the battery unit 110 to the converters 11A in the discharge circuit 11 via the first circuit units 130. In the discharge circuit 11, the control unit 12 starts the operation of the converters 11A. Also, the first load switches 131B of each of the third conductive paths 131A are closed by the control unit 12, and the second load switches 131C are opened by the control unit 12. In this manner, power is supplied from the converters 11A to the first load 51.

Active Cell Balancing Operation

The control unit 12 performs the first control to cause the balance circuits 270 to perform the cell balancing operation. The control unit 12 operates each switch unit 272 to perform the operation of selectively closing the one switch pair 272A in the switch unit 272 of the balance circuit 270, and opening the other switch pairs 272A, alternately on all the switch pairs 272A (hereinafter also referred to as "alternative operation") (see FIG. 9). The switch pair 272A being closed means that both the first switch element 272B and the second switch element 272C in the switch pair 272A are closed. The switch pair 272A being open means that both the first switch element 272B and the second switch element 272C in the switch pair 272A are open. The lengths of time for the alternative operations of the switch pairs 272A may be the same, or different as necessary. Also, at the time of alternative operation, when switching the closed state of the switch pair 272A that is currently closed to the next switch pair 272A, a fixed non-conduction time in which all the switch pairs 272A are opened is provided. The length of the non-conduction time can be set as necessary.

Figure 9:
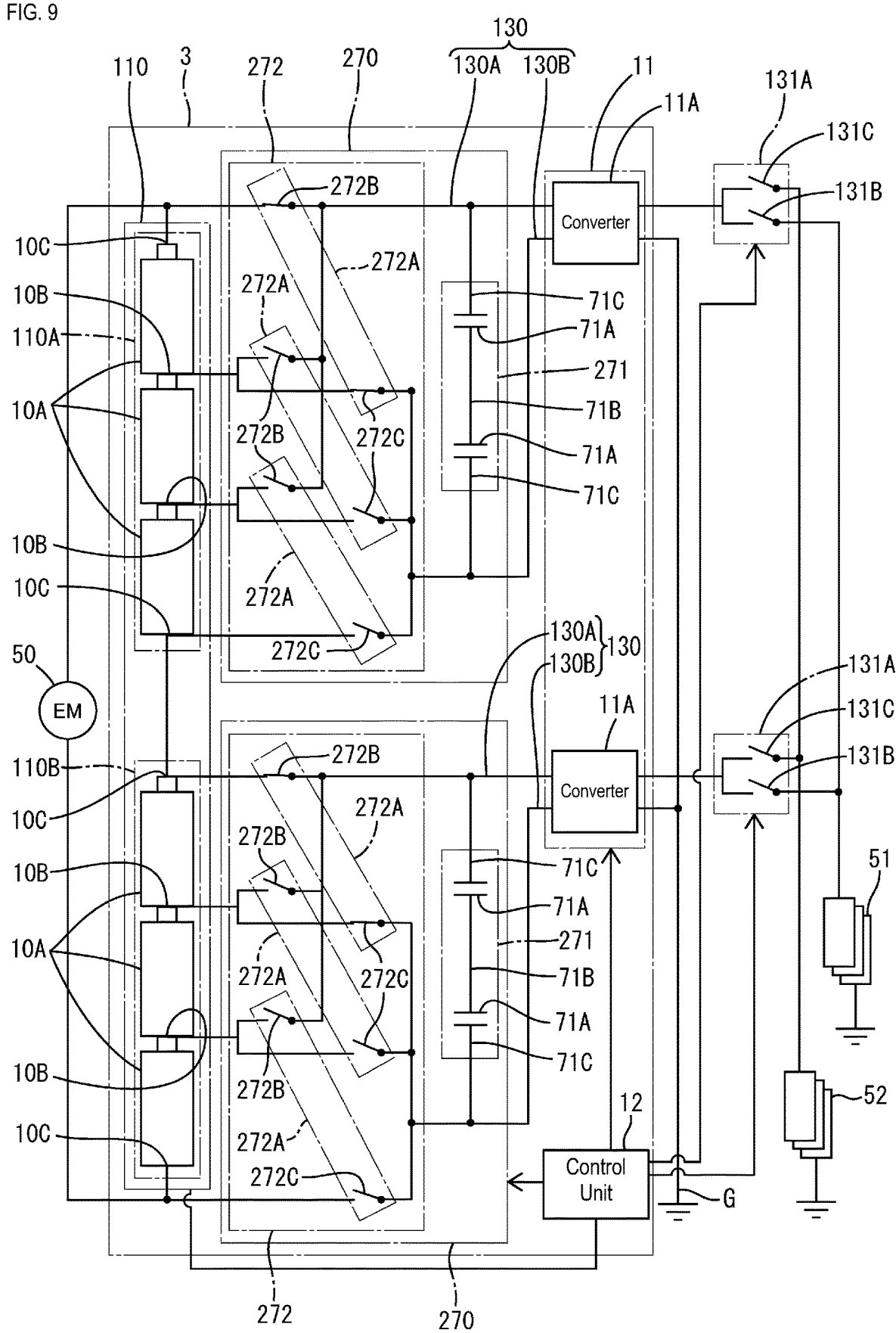
FIG. 9 is a circuit diagram schematically showing the in-vehicle backup power supply device according to the third embodiment, in which switch units are performing an alternative operation.

When the alternative operation is performed in the switch unit 272 of each balance circuit 270, one unit battery 10A and power storage unit 271 are connected in parallel (see FIG. 9). The movement of the charge between the unit batteries 10A and the power storage unit 271 depends on the voltage at the unit batteries 10A and the power storage unit 271. Specifically, when the voltage of the unit battery 10A is higher than the voltage of the power storage unit 271, the charge moves from the unit battery 10A to the power storage unit 271 to charge the power storage unit 271. On the other hand, if the voltage of the power storage unit 271 is higher than the voltage of the unit battery 10A, the charge moves from the power storage unit 271 to the unit battery 10A to charge the unit battery 10A. This holds true also for the other unit batteries 10A and the power storage units 271 when the other switch pairs 272A are closed in the alternative operation. For example, when the control unit 12 determines that the differences of the potential differences of the two ends of the unit batteries 10A are less than or equal to a predetermined value (in other words, the potential differences between the two ends of the unit batteries 10A became the same), the balance circuits 270 end the cell balancing operation.

Second Discharge Operation

In the failed state, the control unit 12 causes the balance circuits 270 to perform the second discharge operation. In the failed state, the control unit 12 opens all the switch pairs 272A in the switch units 272 (see FIG. 7). In this manner, only the charge accumulated in the power storage units 271 is supplied to the converters 11A via the first circuit unit 30. Due to the control unit 12 performing the second control, the converters 11A perform the second discharge operation for stepping up or down the input voltage based on the power from the power storage elements 71A to supply power to the third conductive path 131A.

Next, the effects of this configuration will be illustrated.

The discharge circuit 11 of the in-vehicle backup power supply device 3 of the present disclosure includes the converters 11A for stepping up or down the voltage that is input and output the resultant voltage. When performing the second control, the control unit 12 can operate the converters 11A to step up or down the input voltage based on the power supplied from the power storage elements 71A and supply power to the third conductive paths 131A.

With this configuration, the power of the desired magnitude can be supplied to the third conductive paths 131A based on the power supplied from the power storage elements 71A. Specifically, when stepping up the power supplied from the power storage elements 71A through the converters 11A, the power stored in the power storage elements 71A can be effectively used.

In the in-vehicle backup power supply device 3 of the present disclosure, the balance circuit 270 includes a power storage unit 271 formed by a plurality of power storage elements 71A and the switch unit 272 including the plurality of switch pairs 272A. The switch pairs 272A respectively correspond to the unit batteries 10A. One end element electrode portion 71C of the power storage unit 271 is electrically connected to the high potential electrode of the unit battery 10A to which the switch pair 272A corresponds. Also, the other end element electrode portion 71C of the power storage unit 271 is electrically connected to the low potential electrode of the unit battery 10A to which the switch pair 272A corresponds. When performing the second control, the control unit 12 electrically connects the one end element electrode portion 71C of the power storage unit 271 to the high potential electrode with respect to one unit battery 10A. Also, the control unit 12 operates the plurality of switch pairs 272A to perform the operation in which the other end element electrode portion 71C of the power storage unit 271 is electrically connected to the low potential electrode, alternately on each of the plurality of unit batteries 10A. When performing the second discharge control, the control unit 12 operates the plurality of switch pairs 272A such that the high and low potential electrodes of the unit batteries 10A and the end element electrode portions 71C are not connected to each other.

With this configuration, since the cell balancing operation can be performed using one power storage element 71A, the power supply device 3 can be made smaller.

Fourth Embodiment

Figure 10:
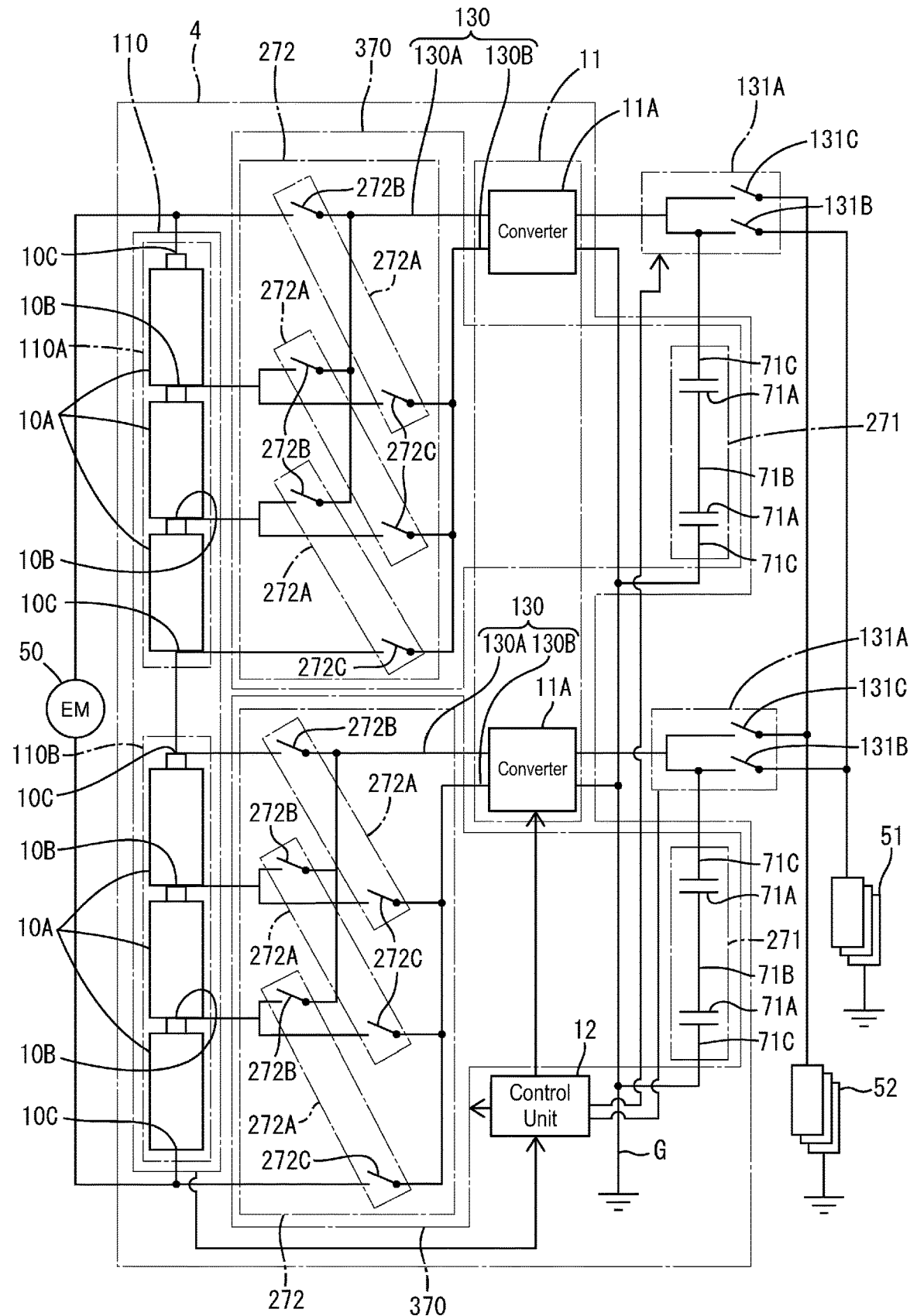
FIG. 10 is a circuit diagram schematically showing an in-vehicle backup power supply device according to a fourth embodiment, in which the first switch elements and the second switch elements are in the non-connecting state.
Figure 11:
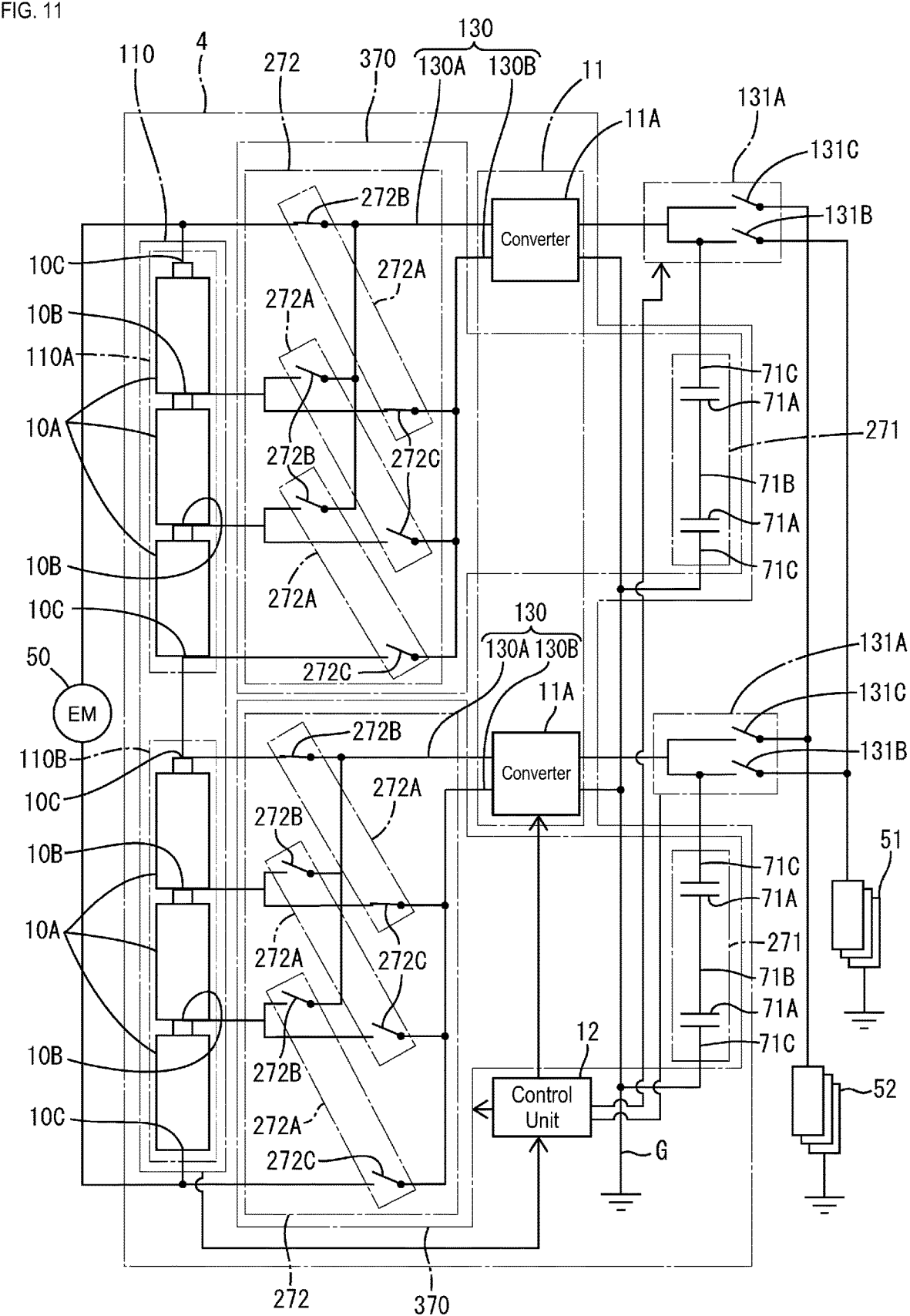
FIG. 11 is a circuit diagram schematically showing the in-vehicle backup power supply device according to the fourth embodiment, in which the switch units are performing an alternative operation.

Next, an in-vehicle backup power supply device 4 (hereinafter also referred to as "power supply device 4") according to a fourth embodiment will be described with reference to FIGS. 10 and 11. The power supply device 4 is different from the third embodiment in the location to which the two end element electrode portions 71C of the power storage unit 271 are connected. The constituent elements that are the same as that of the third embodiment are given the same reference numerals and description of their structure, operation, and effects will be omitted.

Configuration of Power Supply Device

Each balance circuit 370 includes a switch unit 272 and a power storage unit 271. The configurations of the switch unit 272 and the power storage unit 271 are the same as those of the third embodiment. One end element electrode portion 71C of the power storage unit 271 is electrically connected to the discharge circuit 11 side of the third conductive path 31A. The other end element electrode portion 71C of the power storage unit 271 is electrically connected to the ground path G that is the conductive path on the load side. The converters 11A are also electrically connected to the ground path G. The control unit 12 is configured to monitor the potential difference between the two ends of the unit batteries 10A of the battery unit 110, and the connection of the unit batteries 10A to the inter-battery electrode portions 10B and the end electrode portions 10C. The control unit 12 is configured to monitor the potential difference between the two ends of the power storage elements 71A of the power storage unit 271 and the like.

Next, the operations of the power supply device 4 will be described.

First Discharge Operation

The first discharge operation of the power supply device 4 is similar to that of the third embodiment.

Active Cell Balancing Operation

The control unit 12 performs the first control to cause the balance circuits 370 to perform the cell balancing operation. When the alternative operation is performed in the switch units 272 of the balance circuits 370, one unit battery 10A and one power storage unit 271 are connected in parallel via the converter 11A (see FIG. 11).

If the control unit 12 determines that the voltage of the unit batteries 10A is higher than the voltage of the power storage units 271, the charge moves from the unit batteries 10A to the power storage units 271 via the converters 11A to charge the power storage units 271. At this time, the converters 11A perform the step up operation based on the voltage of the unit batteries 10A to supply power to the power storage units 271, and thus the charge moves to the power storage units 271 at an early stage.

On the other hand, if the control unit 12 determines that the voltage of the power storage units 271 is higher than the voltage of the unit batteries 10A, the charge moves from the power storage units 271 to the unit batteries 10A via the converters 11A to charge the unit batteries 10A. At this time, the converters 11A perform the step up operation based on the voltage of the power storage units 271 to supply power to the unit batteries 10A, and thus the charge moves to the unit batteries 10A at an early stage. For example, when the control unit 12 determines that the difference between the potential difference between the two ends of the unit batteries 10A is less than or equal to a predetermined value (in other words, the potential differences between the two ends of the unit batteries 10A are similar), the balance circuits 370 end the cell balancing operation.

Second Discharge Operation

In the failed state, the control unit 12 performs the second discharge operation to cause the balance circuits 370 to perform the second discharge operation. In the failed state, as shown in FIG. 10, the control unit 12 opens all the switch pairs 272A of the switch units 272. In this manner, only the charge stored in the power storage units 271 is supplied to the first load 51 via the third conductive paths 31A.

Next, the effects of this configuration will be illustrated.

The discharge circuit 11 of the in-vehicle backup power supply device 4 of the present disclosure includes the converters 11A for stepping up or down the voltage that is input and outputting the resultant voltage. When performing the first control, the control unit 12 operates the converters 11A to step up or down the input voltage based on the power supplied from the power storage elements 71A and supply power to the battery unit 110.

With this configuration, when the balance circuits 370 perform the cell balancing operation, since the input voltage based on the power supplied from the power storage units 271 is stepped up by the converters 11A, it is possible to suppress a decrease of a current flowing between the power storage units 271 and the battery unit 110 when the cell balancing operation has progressed to some extent. Accordingly, it is possible to positively allow a current to flow from the power storage units 271 to the battery unit 110, and the time required for performing the balancing operation can be further shortened.

In the in-vehicle backup power supply device 4 according to the present disclosure, each balance circuit 370 includes a power storage unit 271 formed by one or more power storage elements 71A, and a switch unit 272 including a plurality of switch pairs 272A. The switch pairs 272A respectively correspond to the unit batteries 10A. One end element electrode portion 71C of the power storage unit 271 is electrically connected via the converter 11A to the high potential electrodes of the unit batteries 10A to which the switch pairs 272A correspond. Also, the other end element electrode portion 71C of the power storage unit 271 is electrically connected via the converter 11A to the low potential electrodes of the unit batteries 10A to which the switch pairs 272A correspond. When performing the first control, with respect to one unit battery 10A, the control unit 12 electrically connects the one end element electrode portion 71C of the power storage unit 271 to the high potential electrode via the converter 11A. Also, the control unit 12 operates the plurality of switch pairs 272A to perform the operation for electrically connecting the other end element electrode portion 71C of the power storage unit 271 to the low potential electrode via the converter 11A, alternately on each of the plurality of unit batteries 10A. The control unit 12 operates the converters 11A so as to supply power to whichever of the unit batteries 10A or the power storage units 271 has the lower voltage thereacross. When performing the second control, the control unit 12 can operate the plurality of switch pairs 272A such that the high and low potential electrodes of the unit batteries 10A and the end element electrode portions 71C are not connected to each other.

With this configuration, when the cell balancing operation is performed, the unit batteries 10A are alternatively connected to the converters 11A through the switch units 272. For this reason, one converter 11A can correspond to a plurality of unit batteries 10A, and the configuration of the power supply device 4 can be simplified.

Fifth Embodiment

Next, an in-vehicle backup power supply device 5 according to the fifth embodiment (hereinafter also referred to as "power supply device 5") will be described with reference to FIGS. 12 to 14. The power supply device 5 is different from that of the third and fourth embodiments in that the locations to which the two end element electrode portions 71C of the power storage unit 271 are connected are collectively changed through power storage unit switch units 273. The constituent elements that are the same as those of the third and fourth embodiment are given the same reference numerals, and description of their structures, operations, and effects will be omitted.

Configuration of Power Supply Device

The balance circuits 470 each include the switch unit 272 and the power storage unit 271. The configurations of the switch unit 272 and the power storage unit 271 are similar to the third and fourth embodiments. The two end element electrode portions 71C of the power storage unit 271 are electrically connected to the respective power storage unit switch units 273. MOSFETs or the like are used for the power storage unit switch units 273. The operations of the power storage unit switch units 273 can be controlled by the control unit 12.

Specifically, the power storage unit switch units 273 can perform third and fourth operations. The third operation is an operation performed by the control unit 12 for electrically connecting the one end element electrode portion 71C to the first conductive path 130A of the first circuit unit 130, and the other end element electrode portion 71C to the second conductive path 130B of the first circuit unit 130 (see FIG. 13). The fourth operation is an operation for electrically connecting the one end element electrode portion 71C to the third conductive path 31A and the other end element electrode portion 71C to the ground path G (see FIG. 14). In other words, the power storage unit switch units 273 collectively switch the electric connection of the two end element electrode portions 71C of the power storage unit 271 to either the first circuit unit 130, or the third conductive path 131A and the ground path G.

Also, by the control unit 12, each power storage unit switch unit 273 can also bring the two end element electrodes 71C into a state in which they are electrically connected to neither the first circuit unit 130, the third conductive path 31A, nor the ground path G (hereinafter also referred to as "non-connecting state") (see FIG. 12).

Next, the operation of the power supply device 5 will be described.

First Discharge Operation

The first discharge operation performed by the power supply device 5 is similar to that of the third embodiment.

Active Cell Balancing Operation

Figure 14:
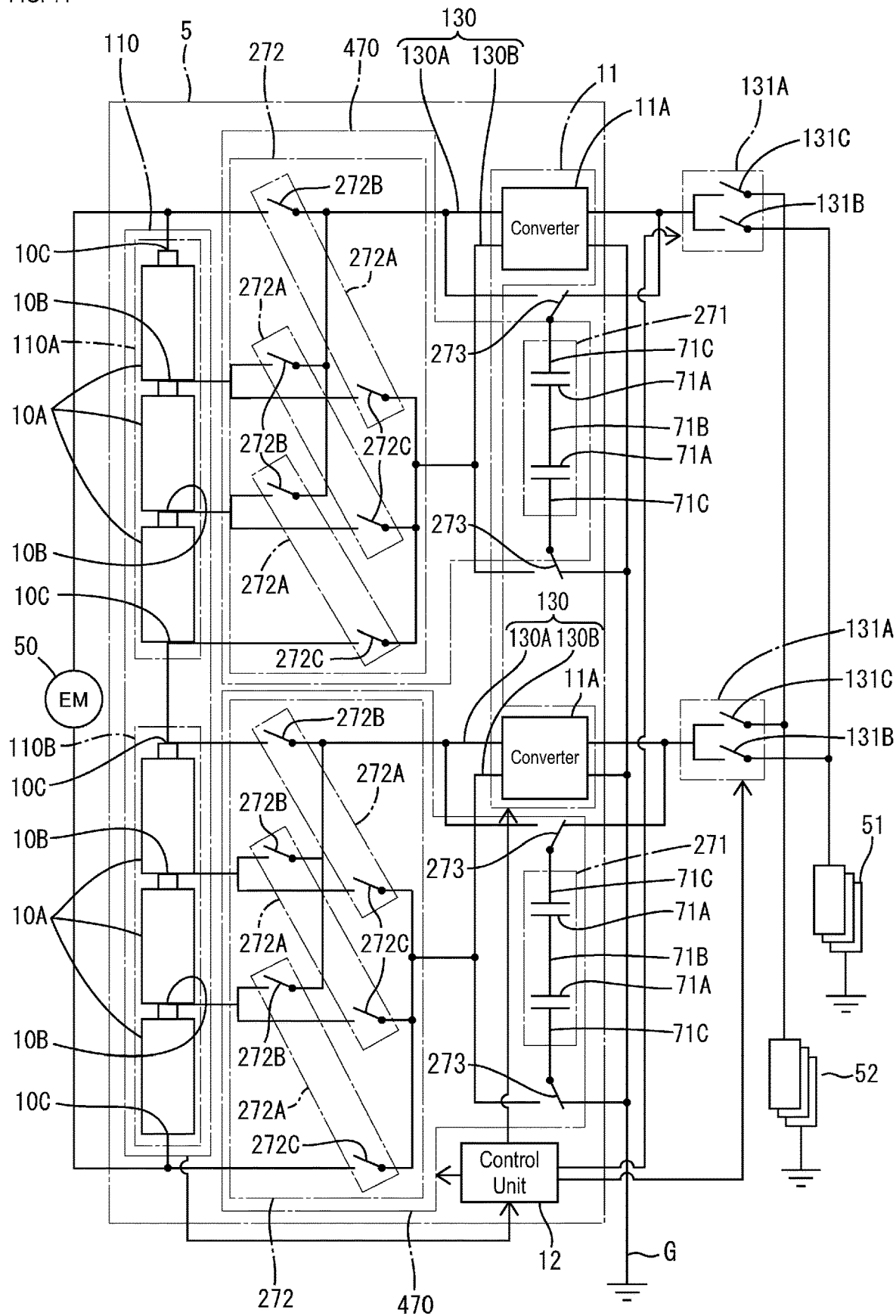
FIG. 14 is a circuit diagram schematically showing the in-vehicle backup power supply device according to the fifth embodiment, in which the power storage unit switch units are performing a fourth operation.

When the balance circuits 470 perform the cell balancing operation, the control unit 12 causes the power storage unit switch units 273 to perform the fourth operation (see FIG. 14). The control unit 12 performs the first control for causing the balance circuits 470 to perform the cell balancing operation. When the control unit 12 controls the switch unit 272 of each balance circuit 470 to operate the alternative operation, one of the unit batteries 10A and the power storage unit 271 are connected in parallel via the converters 11A (not shown). If the voltage of the unit battery 10A is higher than the voltage of the power storage unit 271, the charge moves from the unit battery 10A to the power storage unit 271 via the converter 11A to charge the power storage unit 271. At this time, due to the converter 11A performing the step up operation, the charge can move to the power storage unit 271 at an early stage.

On the other hand, if the voltage of the power storage unit 271 is higher than the voltage of the unit battery 10A, the charge moves from the power storage unit 271 to the unit battery 10A via the converter 11 to charge the unit battery 10A. At this time, due to the converter 11A performing the step-up operation, the charge can move to the unit battery 10A at the early stage.

For example, when the control unit 12 determines that the potential differences of the two ends of the unit batteries 10A are less than or equal to a predetermined value (in other words, the potential differences between the two ends of the unit batteries 10A become similar), the balance circuits 470 end the cell balancing operation.

Figure 12:
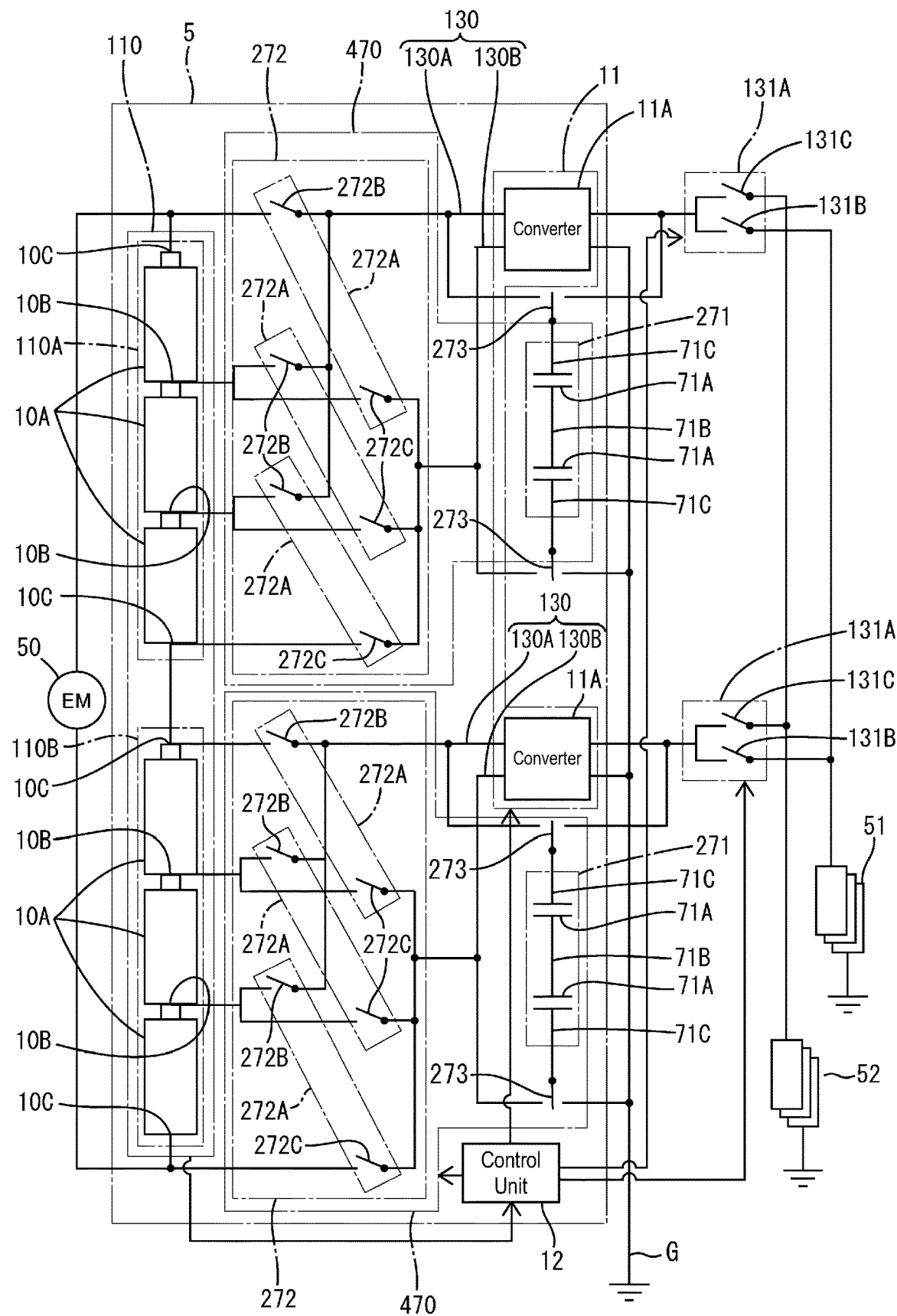
FIG. 12 is a circuit diagram schematically showing an in-vehicle backup power supply device according to a fifth embodiment, in which the first switch elements, the second switch elements, and power storage unit switch units are in the non-connecting state.

When the cell balancing operation ends, the power storage unit switch units 273 of the balance circuits 470 enter the non-connecting state (see FIG. 12). In this manner, the power storage units 271 are maintained in a state in which the power is accumulated.

Second Discharge Operation

Figure 13:
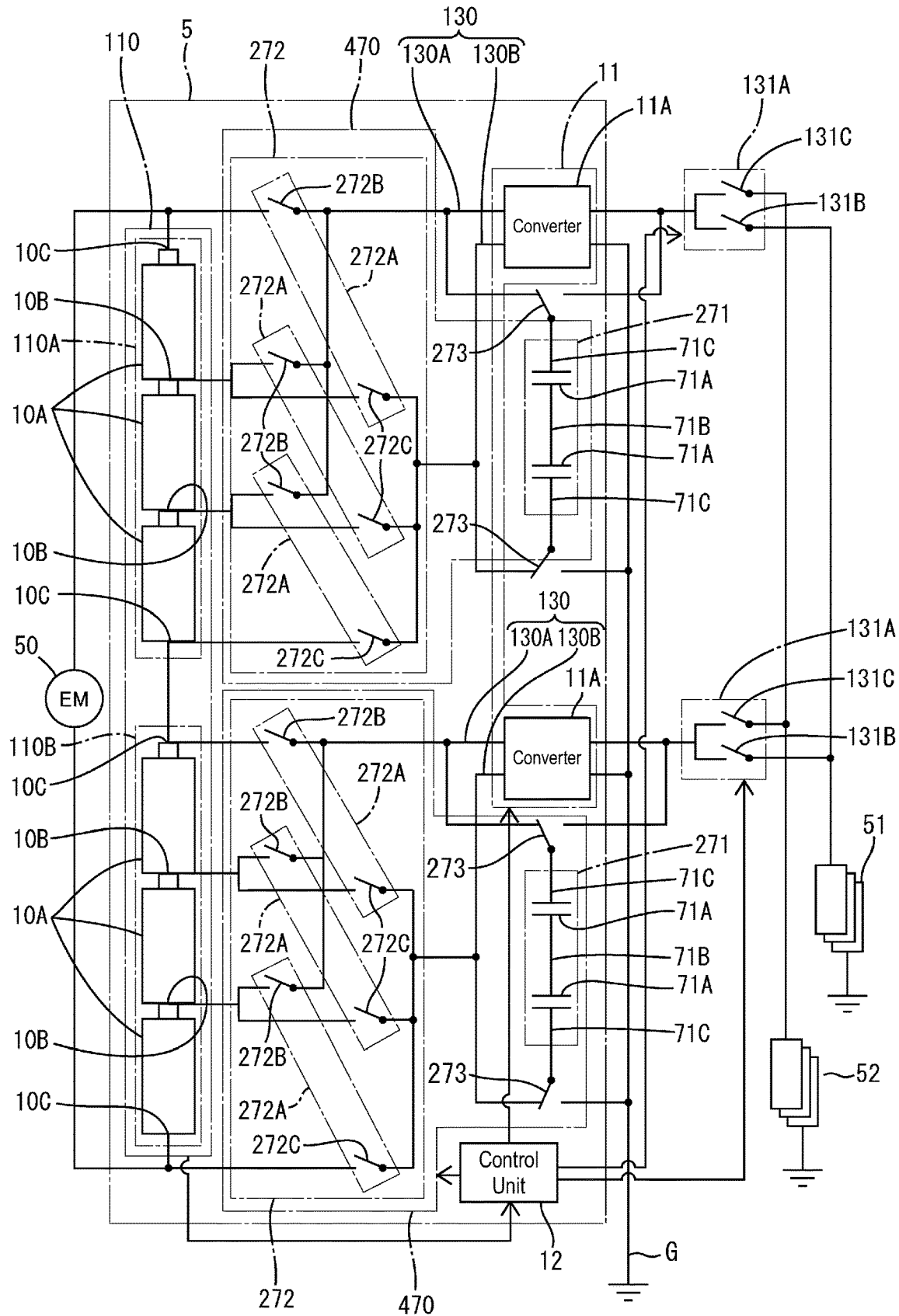
FIG. 13 is a circuit diagram schematically showing the in-vehicle backup power supply device according to the fifth embodiment, in which the power storage unit switch units are performing a third operation.

In the failed state, the control unit 12 causes the power storage unit switch unit 273 to perform the third operation (see FIG. 13). Then, the control unit 12 opens all the switch pairs 272A of the switch units 272. In this manner, only the charge stored in the power storage units 271 is supplied to the converters 11A via the first circuit unit 30. By the control unit 12 performing the second control, the converters 11A perform the operation for stepping up or down the input voltage based on the power supplied from the power storage elements 71A to supply the power to the third conductive paths 131A.

Next, the effects of this configuration will be illustrated.

The discharge circuit 11 of the in-vehicle backup power supply device 5 of the present disclosure includes the converters 11A for stepping up or down the voltage that is input and outputting the resultant voltage. When performing the first control, the control unit 12 operates the converters 11A to step up or down the input voltage based on the power supplied from the power storage elements 71A and supply the power to the battery unit 110. When performing the second control, the control unit 12 operates the converters 11A to step up or down the input voltage based on the power supplied from the power storage elements 71A and supply the power to the third conductive paths 131A.

With this configuration, when the balance circuits 470 performing the second discharge operation, the power of the desired magnitude can be supplied to the third conductive paths 131A based on the voltage of the power storage units 271. Specifically, when stepping up the voltage of the power storage units 271 via the converter 11A, the power stored in the power storage units 271 can be effectively used. Then, when performing the cell balancing operation, due to the power supplied from the power storage units 271 being stepped up by the converters 11A, it is possible to suppress a decrease of the current flowing between the power storage units 271 and the unit batteries 10A when the cell balancing operation has progressed to some extent. Accordingly, the current can be caused to flow between the power storage units 271 and the unit batteries 10A positively. In this manner, the time required for the balancing operation can be further shortened.

In the in-vehicle backup power supply device 5 according to the present disclosure, each balance circuit 470 includes the power storage unit 271 formed by one or more power storage elements 71A and the switch unit 272 provided with the plurality of switch pairs 272A. The switch pairs 272A respectively correspond to the unit batteries 10A. The high potential electrode and the low potential electrode of the unit battery 10A to which each switch pair 272A corresponds are electrically connected to the converters 11A via the first circuit unit 130. The power storage unit switch units 273 for collectively switching the electrical connection of the two end element electrode portions 71C of the power storage unit 271 to either the first circuit unit 130 or the third conductive path 131A is provided. When performing the first control, the control unit 12 operates the power storage unit switch units 273 such that the two end element electrode portions 71C are collectively and electrically connected to the third conductive paths 131A. Also, with respect to one unit battery 10A, the control unit 12 electrically connects the one end element electrode portion 71C of the power storage unit 271 to the high potential electrode via the converter 11A. Also, the control unit 12 operates the plurality of switch pairs 272A to perform the operation for electrically connecting the other end element electrode portion 71C of the power storage unit 271 to the low potential electrode via the converter 11A, alternately on each of the plurality of unit batteries 10A. Then, the control unit 12 operates the converter 11A to supply the power to whichever of the unit batteries 10A or the power storage units 271 has the lower voltage thereacross. When performing the second control, the control unit 12 operates each power storage unit switch unit 273 such that the two end element electrode portions 71C are collectively and electrically connected to the first circuit unit 130. In addition, the control unit 12 operates the plurality of switch pairs 272A such that the high and low potential electrodes of the unit batteries 10A and the first circuit unit 130 are not connected to each other.

With this configuration, since the power storage unit switch units 273 collectively switches electrical connection of the two end element electrode portions 71C to the first circuit unit 130 or the third conductive path 131A, it is possible to suppress a case in which the power storage unit 271 is connected to both the first circuit unit 130 and the third conductive path 131A. In this manner, it is possible to suppress a case in which a malfunction occurs in the converters 11A.

Other Embodiment

This configuration is not limited to the embodiment described using the above description and the drawings, and for example, the following embodiments are also encompassed within the technical scope of the present invention.

Although the first and second embodiments illustrated the configuration in which one power storage element 71A corresponds to one unit battery 10A, it is also possible that a plurality of power storage elements connected in series or parallel correspond to one unit battery.

Although the control unit 12 is mainly constituted by a microcomputer in the first embodiment, the control unit 12 may also be realized by a plurality of hardware circuits other than a microcomputer.

Although the number of unit batteries 10A in each of the unit battery groups 110A and 110B of the battery unit 110 is three in the second to fifth embodiments, the number of unit batteries may also be two or four or more. Also, the numbers of the unit batteries of the unit battery groups need not necessarily be the same.

The embodiments disclosed herein should be construed to be exemplary in all aspects, and not be restrictive. The present invention is not limited to the embodiments disclosed herein, but defined in the claims, and intended to include all modifications within the meaning and the scope equivalent thereof.

The invention claimed is:

1. An in-vehicle backup power supply device in an in-vehicle power supply system, the in-vehicle backup power supply device comprising:
a battery unit in which a plurality of unit batteries are connected in series;
a discharge circuit configured to perform a first discharge operation for supplying power to a conductive path on a load side based on a charge accumulated in the battery unit;
a balance circuit configured to perform a cell balancing operation on the battery unit; and
a control unit configured to control the balance circuit,
wherein the balance circuit is configured to perform a second discharge operation for supplying power to the conductive path on the load side based on a charge accumulated in a plurality of power storage elements, and
the control unit performs a first control for causing the balance circuit to perform the cell balancing operation and a second control for causing the balance circuit to perform the second discharge operation, and if a failure occurs in which the first discharge operation is not normally performed, performs the second control.

2. The in-vehicle backup power supply device according to claim 1, comprising:
a plurality of the balance circuits,
wherein the battery unit includes a plurality of unit battery groups,
the plurality of balance circuits correspond to the plurality of unit battery groups, and
the control unit operates each of the balance circuits independently.

3. The in-vehicle backup power supply device according to claim 1, wherein the discharge circuit includes a converter for stepping up or down a voltage that is input and outputting the resultant voltage, and
when performing the second control, the control unit operates the converter such that the converter steps up or down an input voltage based on the power supplied from the power storage element, and applies an output voltage to the conductive path on the load side.

4. The in-vehicle backup power supply device according to claim 1, wherein the discharge circuit includes a converter configured to step up or down a voltage that is input and outputting the resultant voltage, and
when performing the first control, the control unit operates the converter such that the converter steps up or down an input voltage based on the power supplied from the power storage element and supplies the power to the battery unit side.

5. The in-vehicle backup power supply device according to claim 1, wherein the discharge circuit includes a converter configured to step up or down and output a voltage that is input, and
when performing the first control, the control unit operates the converter to step up or down an input voltage based on the power supplied from the power storage element and supply the power to the battery unit side, and when performing the second control, the control unit operates the converter to step up or down an input voltage based on the power supplied from the power storage element and supply the power to the conductive path on the load side.

6. The in-vehicle backup power supply device according to claim 2, wherein the discharge circuit includes a converter for stepping up or down a voltage that is input and outputting the resultant voltage, and when performing the second control, the control unit operates the converter such that the converter steps up or down an input voltage based on the power supplied from the power storage element, and applies an output voltage to the conductive path on the load side.

7. The in-vehicle backup power supply device according to claim 2, wherein the discharge circuit includes a converter configured to step up or down a voltage that is input and outputting the resultant voltage, and when performing the first control, the control unit operates the converter such that the converter steps up or down an input voltage based on the power supplied from the power storage element and supplies the power to the battery unit side.

8. The in-vehicle backup power supply device according to claim 2, wherein the discharge circuit includes a converter configured to step up or down and output a voltage that is input, and when performing the first control, the control unit operates the converter to step up or down an input voltage based on the power supplied from the power storage element and supply the power to the battery unit side, and when performing the second control, the control unit operates the converter to step up or down an input voltage based on the power supplied from the power storage element and supply the power to the conductive path on the load side.

* * * * *